(12) United States Patent
Sato et al.

(10) Patent No.: US 12,130,435 B2
(45) Date of Patent: Oct. 29, 2024

(54) LIGHT GUIDE ELEMENT AND IMAGE DISPLAY APPARATUS

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 494 days.

(21) Appl. No.: 17/521,027

(22) Filed: Nov. 8, 2021

(65) Prior Publication Data

US 2022/0057638 A1  Feb. 24, 2022

Related U.S. Application Data

(63) Continuation of application No. PCT/JP2020/017754, filed on Apr. 24, 2020.

(30) Foreign Application Priority Data

May 9, 2019  (JP) .................................. 2019-089097

(51) Int. Cl.
*G02B 27/00* (2006.01)
*G02B 5/30* (2006.01)
(Continued)

(52) U.S. Cl.
CPC ....... *G02B 27/0172* (2013.01); *G02B 5/3016* (2013.01); *G02B 27/4205* (2013.01)

(58) Field of Classification Search
CPC .............. G02B 27/0172; G02B 5/3016; G02B 27/4205; G02B 27/4272;
(Continued)

(56) References Cited

U.S. PATENT DOCUMENTS 9,791,703 B1 * 10/2017 Vallius .................... G02B 6/005
10,969,585 B2 * 4/2021 Tervo ........................ G02B 6/34
(Continued)

FOREIGN PATENT DOCUMENTS

JP  2009-539129 A  11/2009
JP  2010-32997 A   2/2010
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/017754, dated Nov. 18, 2021.
(Continued)

*Primary Examiner* — Henry Duong
(74) *Attorney, Agent, or Firm* — Birch, Stewart, Kolasch & Birch, LLP

(57) ABSTRACT

Provided are a light guide element and an image display apparatus capable of suppressing the occurrence of multiple images. The light guide element includes a light guide plate and a first incidence diffraction element, a second incidence diffraction element, a first emission diffraction element, and a second emission diffraction element that are provided on the light guide plate, in which the first and second incidence diffraction elements diffract incident light in different directions to be incident into the light guide plate, the first emission diffraction element emits light that is diffracted by the first incidence diffraction element and propagates in the light guide plate, the second emission diffraction element emits light that is diffracted by the second incidence diffraction element and propagates in the light guide plate, a period of a diffraction structure of the first incidence diffraction element and a period of a diffraction structure of the second incidence diffraction element are different from each
(Continued)

other, a period of a diffraction structure of the first emission diffraction element and a period of a diffraction structure of the second emission diffraction element are different from each other, the first and second emission diffraction elements are disposed at a position where the first and second emission diffraction elements overlap each other in a plane direction of a main surface of the light guide plate, and a periodic direction of the diffraction structure of the first emission diffraction element and a periodic direction of the diffraction structure of the second emission diffraction element intersect with each other.

20 Claims, 11 Drawing Sheets

(51) Int. Cl.
  *G02B 27/01* (2006.01)
  *G02B 27/42* (2006.01)
(58) Field of Classification Search
  CPC .... G02B 2027/0112; G02B 2027/0174; G02B 27/0018; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0178; G02B 2027/0181; G02B 2027/0183; G02B 2027/0185; G02B 2027/019; G02B 2027/0187; G02B 2027/0192; G02B 2027/0194; G02B 2027/0196; G02B 2027/0198
  USPC ........................................................ 359/630
  See application file for complete search history.

(56) References Cited

U.S. PATENT DOCUMENTS

| | | |
|---|---|---|
| 2010/0296163 A1 | 11/2010 | Saarikko et al. |
| 2011/0096401 A1 | 4/2011 | Levola |
| 2017/0299864 A1 | 10/2017 | Vallius et al. |
| 2018/0113309 A1 | 4/2018 | Robbins et al. |

FOREIGN PATENT DOCUMENTS

| | | |
|---|---|---|
| WO | WO 2017/180403 A1 | 10/2017 |
| WO | WO 2018/202951 A1 | 11/2018 |

OTHER PUBLICATIONS

International Search Report (Form PCT/ISA/210) for International Application No. PCT/JP2020/017754, dated Jul. 21, 2020, with English translation.
Kress et al., "Towards the Ultimate Mixed Reality Experience: HoloLens Display Architecture Choices," SID 2017 Digest, 2017, pp. 127-131.

\* cited by examiner

LIGHT GUIDE ELEMENT AND IMAGE DISPLAY APPARATUS

CROSS-REFERENCE TO RELATED APPLICATIONS

This application is a Continuation of PCT International Application No. PCT/JP2020/017754 filed on Apr. 24, 2020, which claims priority under 35 U.S.C. § 119(a) to Japanese Patent Application No. 2019-089097 filed on May 9, 2019. The above application is hereby expressly incorporated by reference, in its entirety, into the present application.

BACKGROUND OF THE INVENTION

1. Field of the Invention

The present invention relates to a light guide element that propagates light, and an image display apparatus that includes the light guide element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light is totally reflected and propagates in the light guide plate. The light propagated in the light guide plate is also diffracted by the diffraction element in the other end portion of the light guide plate and is emitted from the light guide plate to an observation position by the user.

In AR glasses, for example, a video consisting of light components having light wavelengths of three colors including red (R), green (G), and blue (B) is emitted from a display, and each of the light components is diffracted and guided into a light guide plate and is emitted from the light guide plate to an observation position of a user by a diffraction element such that the three color images overlap each other and are displayed. As a result, a color image can be displayed (refer to WO2017/180403A).

SUMMARY OF THE INVENTION

According to an investigation, the present inventors found that, in a case where emission side diffraction elements corresponding to the respective colors are disposed to overlap each other to display a color image, there is a problem in that multiple images occur.

Specifically, in AR glasses, for example, in a case where videos consisting of RGB light components overlap to display a color image, for example, the G light is diffracted by a G diffraction element for diffracting G light, and a part of the G light is also diffracted by a R diffraction element for diffracting R light and/or a B diffraction element for diffracting B light. At this time, the G diffraction element is different from the R diffraction element and the B diffraction element in the period of the diffraction structure. Here, as is well known, the diffraction angle of the diffraction element depends on the period of the diffraction structure of the diffraction element and a wavelength of light.

Therefore, the G light diffracted by the G diffraction element, the G light diffracted by the R diffraction element, and the G light diffracted by the B diffraction element are diffracted at different angles. Likewise, regarding the R light and the B light, a part thereof is diffracted at different angles by diffraction elements other than the corresponding diffraction element. As a result, multiple images are visually recognized.

An object of the present invention is to solve the above-described problems in the related art and is to provide a light guide element in which the occurrence of multiple images can be suppressed and an image display apparatus including this light guide element.

In order to achieve the object, the present invention has the following configurations.

[1] A light guide element comprising a light guide plate and a first incidence diffraction element, a second incidence diffraction element, a first emission diffraction element, and a second emission diffraction element that are provided on the light guide plate,
  in which the first incidence diffraction element and the second incidence diffraction element diffract incident light in different directions to be incident into the light guide plate,
  the first emission diffraction element emits light that is diffracted by the first incidence diffraction element and propagates in the light guide plate from the light guide plate,
  the second emission diffraction element emits light that is diffracted by the second incidence diffraction element and propagates in the light guide plate from the light guide plate,
  a period of a diffraction structure of the first incidence diffraction element and a period of a diffraction structure of the second incidence diffraction element are different from each other,
  a period of a diffraction structure of the first emission diffraction element and a period of a diffraction structure of the second emission diffraction element are different from each other,
  the first emission diffraction element and the second emission diffraction element are disposed at a position where the first emission diffraction element and the second emission diffraction element overlap each other in a plane direction of a main surface of the light guide plate, and
  a periodic direction of the diffraction structure of the first emission diffraction element and a periodic direction of the diffraction structure of the second emission diffraction element intersect with each other.

[2] The light guide element according to [1], further comprising a first intermediate diffraction element and a second intermediate diffraction element that are provided on the light guide plate, in which the first intermediate diffraction element diffracts light that is diffracted by the first incidence diffraction element and propagates in the light guide plate to the first emission diffraction element, the second intermediate diffraction element diffracts light that is diffracted by the second incidence diffraction element and propagates in the light guide plate to the second emission diffraction element, and a period of a diffraction structure of the first intermediate diffraction element and a period of a diffraction structure of the second intermediate diffraction element are different from each other.

[3] The light guide element according to [2],
in which each of the first intermediate diffraction element and the second intermediate diffraction element is any one of a surface relief type diffraction element, a volume hologram type diffraction element, or a polarization diffraction element.

[4] The light guide element according to [2] or [3],
wherein in a case where the period of the diffraction structure of the first incidence diffraction element is represented by $\wedge_{i1}$, the period of the diffraction structure of the second incidence diffraction element is represented by $\wedge_{i2}$, the period of the diffraction structure of the first intermediate diffraction element is represented by $\wedge_{e1}$, the period of the diffraction structure of the second intermediate diffraction element is represented by $\wedge_{e2}$, the period of the diffraction structure of the first emission diffraction element is represented by $\wedge_{o1}$, and the period of the diffraction structure of the second emission diffraction element is represented by $\wedge_{o2}$, $\wedge_{e1} \leq \wedge_{i1}$,
$\wedge_{e1} \leq \wedge_{o1}$,
$\wedge_{e2} \leq \wedge_{i2}$, and
$\wedge_{e2} \leq \wedge_{o2}$
are satisfied.

[5] The light guide element according to any one of [1] to [4],
in which each of the first incidence diffraction element, the second incidence diffraction element, the first emission diffraction element, and the second emission diffraction element is any one of a surface relief type diffraction element, a volume hologram type diffraction element, or a polarization diffraction element.

[6] The light guide element according to [3] or [5],
in which the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

[7] The light guide element according to [6],
in which the liquid crystal diffraction element has a region in which the direction of the optical axis of the liquid crystal compound is helically twisted and rotates in a thickness direction.

[8] The light guide element according to [6] or [7],
in which the liquid crystal diffraction element includes a cholesteric liquid crystal layer obtained by immobilizing a cholesteric liquid crystalline phase.

[9] The light guide element according to any one of [6] to [8],
in which the liquid crystal diffraction element has a configuration in which the optical axis of the liquid crystal compound is tilted with respect to a main surface of the liquid crystal diffraction element.

[10] The light guide element according to any one of [6] to [9],
wherein in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

[11] The light guide element according to any one of [1] to [10],
in which the first incidence diffraction element and the second incidence diffraction element are laminated.

[12] The light guide element according to any one of [1] to [10],
in which the first incidence diffraction element and the second incidence diffraction element are disposed at different positions in the plane direction of the light guide plate.

[13] The light guide element according to any one of [1] to [12],
in which the first emission diffraction element and the second emission diffraction element are laminated.

[14] The light guide element according to any one of [1] to [13],
in which the periods of the diffraction structures of the first incidence diffraction element, the second incidence diffraction element, the first emission diffraction element, and
the second emission diffraction element are 1 μm or less.

[15] The light guide element according to any one of [1] to [14], further comprising a third incidence diffraction element and a third emission diffraction element that are provided on the light guide plate,
in which the third incidence diffraction element and the first incidence diffraction element diffract incident light in different directions to be incident into the light guide plate,
the third emission diffraction element emits light that is diffracted by the third incidence diffraction element and propagates in the light guide plate from the light guide plate,
a period of a diffraction structure of the third incidence diffraction element is different from the periods of the diffraction structures of the first incidence diffraction element and the second incidence diffraction element,
a period of a diffraction structure of the third emission diffraction element is different from the periods of the diffraction structures of the first emission diffraction element and the second emission diffraction element,
the third emission diffraction element is disposed at a position where the third emission diffraction element overlaps the first emission diffraction element and the second emission diffraction element in the plane direction of the main surface of the light guide plate, and
a periodic direction of the diffraction structure of the third emission diffraction element and a periodic direction of the diffraction structure of the first emission diffraction element intersect with each other.

[16] The light guide element according to [15],
in which in a case where the period of the diffraction structure of the first incidence diffraction element is represented by $\wedge_{i1}$, the period of the diffraction structure of the second incidence diffraction element is represented by $\wedge_{i2}$, and the period of the diffraction structure of the third incidence diffraction element is represented by $\wedge_{i3}$, $\wedge_{i3} \le \wedge_{i1}$, $\wedge_{i2}$ is satisfied.

[17] An image display apparatus comprising:
the light guide element according to any one of [1] to [16]; and
a display element that emits an image to the first incidence diffraction element and the second incidence diffraction element of the light guide element.

[18] The image display apparatus according to [17],
in which the display element emits circularly polarized light.

[19] The image display apparatus according to [17] or [18], comprising:
a first display element that emits an image to the first incidence diffraction element of the light guide element; and
a second display element that emits an image to the second incidence diffraction element of the light guide element,
in which a center wavelength of light emitted from the first display element and a center wavelength of light emitted from the second display element are different from each other.

According to the present invention, it is possible to provide: a light guide element capable of suppressing the occurrence of multiple image; and an image display apparatus including this light guide element.

DESCRIPTION OF THE PREFERRED EMBODIMENTS

Figure 1:
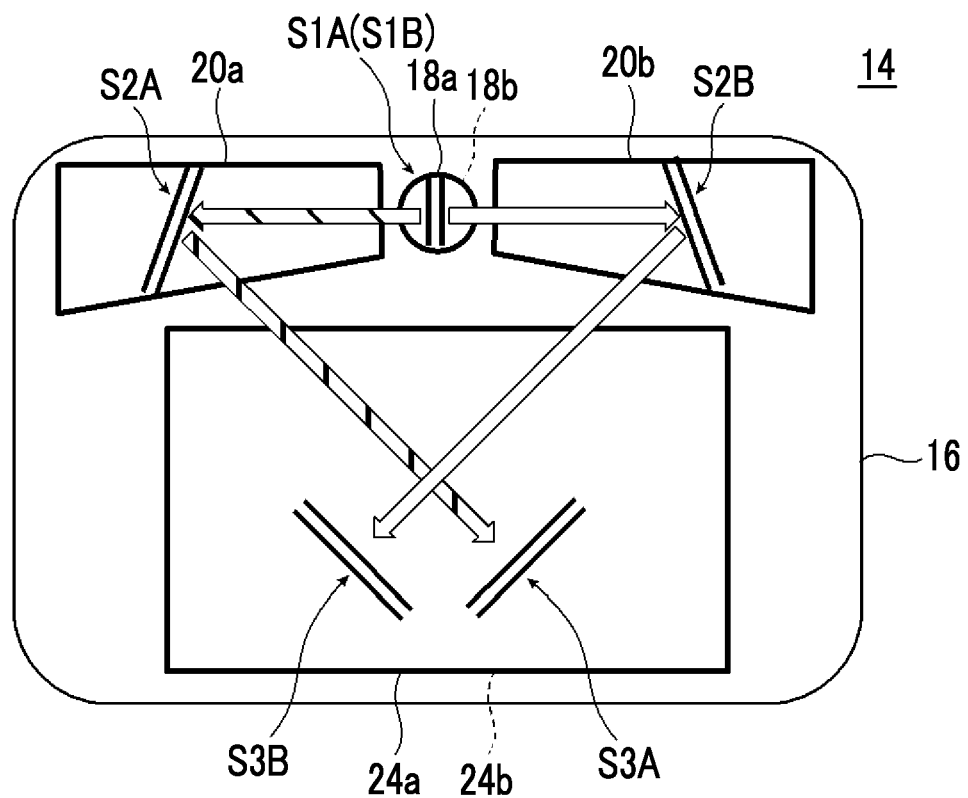
FIG. 1 is a front view conceptually showing an example of an image display apparatus including a light guide element according to the present invention.

Hereinafter, a light guide element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

[Light Guide Element and Image Display Apparatus]

The light guide element according to the embodiment of the present invention includes a light guide plate and a first incidence diffraction element, a second incidence diffraction element, a first emission diffraction element, and a second emission diffraction element that are provided on the light guide plate,
in which the first incidence diffraction element and the second incidence diffraction element diffract incident light in different directions to be incident into the light guide plate,
the first emission diffraction element emits light that is diffracted by the first incidence diffraction element and propagates in the light guide plate from the light guide plate,
the second emission diffraction element emits light that is diffracted by the second incidence diffraction element and propagates in the light guide plate from the light guide plate, a period of a diffraction structure of the first incidence diffraction element and a period of a diffraction structure of the second incidence diffraction element are different from each other, a period of a diffraction structure of the first emission diffraction element and a period of a diffraction structure of the second emission diffraction element are different from each other, the first emission diffraction element and the second emission diffraction element are disposed at a position where the first emission diffraction element and the second emission diffraction element overlap each other in a plane direction of a main surface of the light guide plate, and a periodic direction of the diffraction structure of the first emission diffraction element and a periodic direction of the diffraction structure of the second emission diffraction element intersect with each other.

It is preferable that the light guide element according to the embodiment of the present invention further comprises a first intermediate diffraction element and a second intermediate diffraction element that are provided on the light guide plate, the first intermediate diffraction element diffracts light that is diffracted by the first incidence diffraction element and propagates in the light guide plate to the first emission diffraction element, the second intermediate diffraction element diffracts light that is diffracted by the second incidence diffraction element and propagates in the light guide plate to the second emission diffraction element, and a period of a diffraction structure of the first intermediate diffraction element and a period of a diffraction structure of the second intermediate diffraction element are different from each other.

The image display apparatus according to the embodiment of the present invention comprises:

the above-described light guide element; and a display element that emits an image to the first incidence diffraction element and the second incidence diffraction element of the light guide element.

The image display apparatus according to the embodiment of the present invention displays images of two or more colors.

Figure 2:
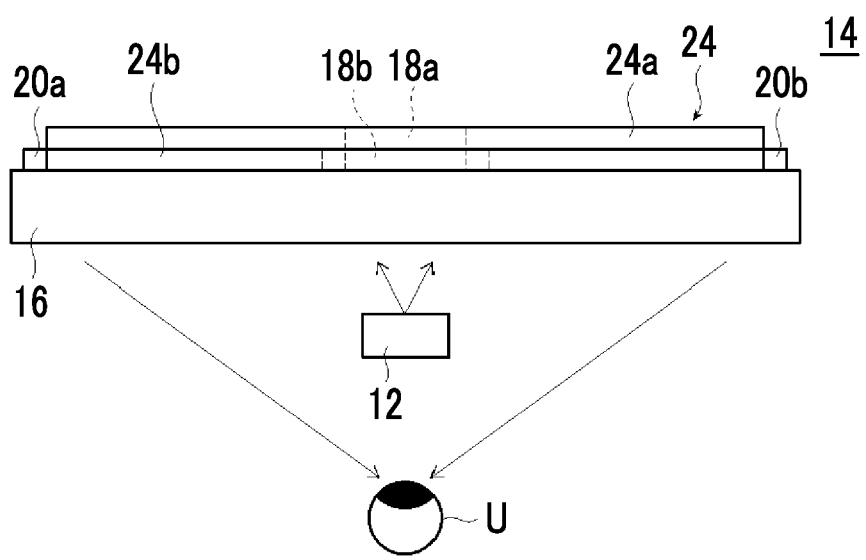
FIG. 2 is a bottom view conceptually showing the image display apparatus shown in FIG. 1.
Figure 3:
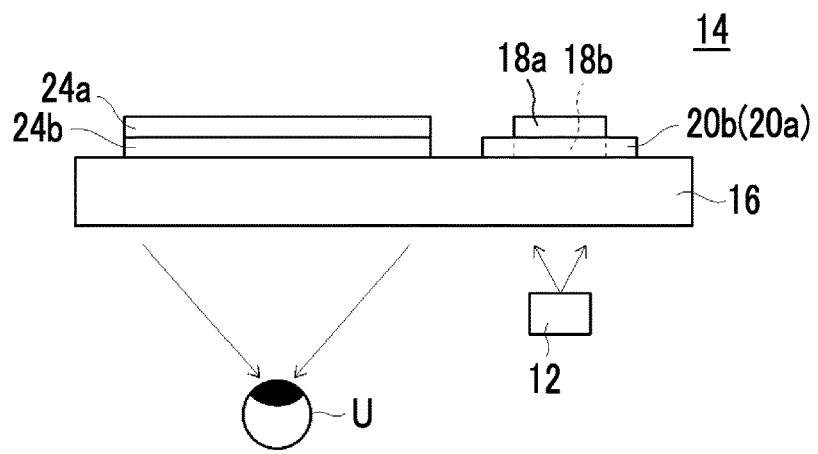
FIG. 3 is a side view conceptually showing the image display apparatus shown in FIG. 1.

FIGS. 1 to 3 conceptually shows an example of the image display apparatus according to the embodiment of the present invention including the light guide element according to the embodiment of the present invention. FIG. 1 is a front view showing the image display apparatus 10 in case of being seen from a side opposite to an observation side by a user U. FIG. 2 is a bottom view showing the image display apparatus 10 in case of being seen from a lower direction on the plane of FIG. 1. FIG. 3 is a side view showing the image display apparatus 10 in case of being seen from the right side on the plane of FIG. 1.

The image display apparatus 10 shown in FIG. 1 is used as AR glasses as a preferable example. The light guide element according to the embodiment of the present invention can also be used not only as AR glasses but also as an optical element such as a transparent screen, an lighting device (including a backlight unit or the like of a liquid crystal display), or a sensor. In addition, the image display apparatus according to the embodiment of the present invention can also be used as an image display apparatus including the optical element.

The image display apparatus 10 shown in FIGS. 1 to 3 includes: a display element 12; a light guide plate 16; and a light guide element 14 that is provided on the light guide plate 16 and includes a first incidence diffraction element 18a, a second incidence diffraction element 18b, a first intermediate diffraction element 20a, a second intermediate diffraction element 20b, a first emission diffraction element 24a, and a second emission diffraction element 24b. FIG. 1 does not show the display element 12.

In the image display apparatus 10, images (light components corresponding to the images) displayed by the display element 12 are diffracted in different directions to be incident into the light guide plate 16 by the first incidence diffraction element 18a and the second incidence diffraction element 18b per predetermined wavelength range. The diffracted light by the first incidence diffraction element 18a is totally reflected and propagates in the light guide plate 16 such that the diffracted light is incident into the first intermediate diffraction element 20a. The light incident into the first intermediate diffraction element 20a is diffract to the first emission diffraction element 24a, is totally reflected and propagates in the light guide plate 16 to be incident into the first emission diffraction element 24a, and is diffracted by the first emission diffraction element 24a to be emitted from the light guide plate 16. In addition, the diffracted light by the second incidence diffraction element 18b is totally reflected and propagates in the light guide plate 16 such that the diffracted light is incident into the second intermediate diffraction element 20b. The light incident into the second intermediate diffraction element 20b is diffract to the second emission diffraction element 24b, is totally reflected and propagates in the light guide plate 16 to be incident into the second emission diffraction element 24b, and is diffracted by the second emission diffraction element 24b to be emitted from the light guide plate 16.

The first emission diffraction element 24a and the second emission diffraction element 24b are disposed to overlap each other in a plane direction of a main surface of the light guide plate 16 (hereinafter, also simply referred to as "plane direction"). Therefore, the light components diffracted and emitted by the first emission diffraction element 24a and the second emission diffraction element 24b are emitted from the light guide plate 16 at the same position and are provided for observation of the user U. As a result, two colors can be displayed.

The light guide element according to the embodiment of the present invention has a configuration in which, in a case where light is diffracted by the first intermediate diffraction element 20a, the second intermediate diffraction element 20b, the first emission diffraction element 24a, and the second emission diffraction element 24b, a part of the light is diffracted at a plurality of positions of the diffraction element. As a result, the viewing zone can be widened (exit pupil expansion).

[Display Element]

The display element 12 displays an image (video) to be observed by the user U and emits the image to first incidence diffraction element 18a and the second incidence diffraction element 18b. Accordingly, the display element 12 is disposed such that the emitted image is incident into the first incidence diffraction element 18a and the second incidence diffraction element 18b. In the example shown in FIGS. 1 to 3, the display element 12 is disposed to face the first incidence diffraction element 18a and the second incidence diffraction element 18b. In the image display apparatus 10 according to the embodiment of the present invention, as the display element 12, various well-known display elements (a display device or a projector) used for AR glasses or the like can be used without any particular limitation. Examples of the display element 12 include a display element including a display and a projection lens.

In the image display apparatus 10 according to the embodiment of the present invention, the display is not particularly limited. For example, various well-known displays used in AR glasses or the like can be used.

Examples of the display include a liquid crystal display (LCOS including Liquid Crystal On Silicon), an organic electroluminescent display, and a scanning type display employing a digital light processing (DLP) or Micro Electro Mechanical Systems (MEMS) mirror.

As shown in FIGS. 1 to 3, in a case where the first incidence diffraction element 18a and the second incidence diffraction element 18b are disposed at a position where they overlap each other in the plane direction of the light guide plate, a display that displays a two-color image using the light having a wavelength diffracted by the first incidence diffraction element 18a and the light having a wavelength diffracted by the second incidence diffraction element 18b is used as the display.

In addition, as described below using FIG. 6, in a case where the first incidence diffraction element 18a and the second incidence diffraction element 18b are disposed at positions where they do not overlap each other in the plane direction, two kinds of displays are used, the displays including: a display (first display element) that emits a monochromic image to the first incidence diffraction element 18a; and a display (second display element) that emits a monochromic image to the second incidence diffraction element 18b. The colors (center wavelengths of the light) of the images emitted from the two displays are different from each other.

Regarding this point, as in the case of the other configurations, in a case where a plurality of incidence diffraction elements are disposed to overlap each other in the plane direction, a display that displays a multi-color image using light components having a plurality of wavelengths corresponding to the respective incidence diffraction elements is used. In addition, in a case where a plurality of incidence diffraction elements are disposed at positions where they do not overlap each other in the plane direction, a plurality of displays that display images of light components having wavelengths corresponding to the incidence diffraction elements are used.

In addition, in a case where a plurality of incidence diffraction elements are disposed at positions where they do not overlap each other in the plane direction, a configuration may be adopted in which light emitted from the display that displays a polychromic image is dispersed for each wavelength to be incident into the incidence diffraction element.

In the display element 12 used in the image display apparatus 10 according to the embodiment of the present invention, the projection lens is also a well-known projection lens (collimating lens) used for AR glasses or the like.

Here, in the image display apparatus 10 according to the embodiment of the present invention, a display image by the display element 12, that is, light to be emitted from the display element 12 is not limited and is preferably unpolarized light (natural light) or circularly polarized light.

In a case where the display element 12 emits circularly polarized light and the display emits an unpolarized light image, and it is preferable that the display element 12 includes, for example, a circular polarization plate including a linear polarizer and an λ/4 plate. In addition, in a case where the display emits a linearly polarized light image, it is preferable that the display element 12 includes, for example, a λ/4 plate.

The light to be emitted by the display element 12 may be, for example, another polarized light (for example, linearly polarized light).

[Light Guide Plate]

In the light guide element 14, the light guide plate 16 is a well-known light guide plate that reflects light incident thereinto and guides (propagates) the reflected light.

As the light guide plate 16, various well-known light guide plates used for a backlight unit or the like of AR glasses or a liquid crystal display can be used without any particular limitation.

[Diffraction Element]

The light guide element 14 includes the first incidence diffraction element 18a, the second incidence diffraction element 18b, the first intermediate diffraction element 20a, the second intermediate diffraction element 20b, the first emission diffraction element 24a, and the second emission diffraction element 24b on the main surface of the light guide plate 16. The main surface is the maximum surface of a sheet-shaped material (a plate-shaped material, a film, or the like). In the example shown in the drawings, the first incidence diffraction element 18a, the second incidence diffraction element 18b, the first intermediate diffraction element 20a, the second intermediate diffraction element 20b, the first emission diffraction element 24a, and the second emission diffraction element 24b are provided on the main surface of the light guide plate 16. The respective diffraction elements may be provided on different main surfaces as long as the main surfaces are main surfaces of the light guide plate 16.

As the first incidence diffraction element 18a, the second incidence diffraction element 18b, the first intermediate diffraction element 20a, the second intermediate diffraction element 20b, the first emission diffraction element 24a, and the second emission diffraction element 24b, various diffraction elements can be used. In the following description, in a case where the first incidence diffraction element 18a, the second incidence diffraction element 18b, the first intermediate diffraction element 20a, the second intermediate diffraction element 20b, the first emission diffraction element 24a, and the second emission diffraction element 24b do not need to be distinguished from each other, these will be collectively referred to as "diffraction elements".

It is preferable that each of the diffraction elements is any one of a surface relief type diffraction element, a volume hologram type diffraction element, or a polarization diffraction element.

It is preferable that the polarization diffraction element is a liquid crystal diffraction element that is formed of a composition including a liquid crystal compound. In addition, it is also preferable that the liquid crystal diffraction element includes a cholesteric liquid crystal layer obtained by immobilizing a cholesteric liquid crystalline phase.

Each of the diffraction elements will be described below in detail.

For example, in a case where the diffraction element is a surface relief type diffraction element, light is diffracted by a diffraction structure having a repeating pattern where linear unevenness is alternately arranged. At this time, the diffraction angle is determined depending on the wavelength of light, the period of the pattern of the diffraction structure, and the like. Therefore, it is necessary to use a diffraction element in which the period of the diffraction structure varies depending on the wavelength of light.

For example, in a case where the display element emits light components of three colors including red (R), green (G), and blue (B) and light is diffracted using diffraction elements having the same diffraction structure period, the diffraction angles of the light components having wavelengths of R, G, and B are different from each other. Therefore, in a case where the light components are incident into the light guide plate 16, the incidence angle ranges of the light components R, G, and B guided (totally reflected) into the light guide plate 16 are different from each other, and the common incidence angle range where the light components R, G, and B are totally reflected in the light guide plate 16 becomes narrower. Thus, in a case where the light is diffracted and emitted by the emission diffraction elements, there is a problem in that, for example, a range where the three RGB color images are seen in an overlapping manner.

Therefore, in order to observe a color image by appropriately causing the three RGB color images to overlap each other, in the image display apparatus, in a case where light components having different wavelengths are emitted from the display element 12 to display a polychromic image (color image, it is necessary to diffract the RGB light components substantially at the same angle while changing the period of the diffraction structure of the diffraction element depending on each of the RGB light components.

(Incidence Diffraction Element)

The first incidence diffraction element 18a and the second incidence diffraction element 18b diffract light emitted from the display element 12 to be incident into the light guide plate 16. In the following description, in a case where the first incidence diffraction element 18a and the second incidence diffraction element 18b do not need to be distinguished from each other, they will also be collectively referred to as "incidence diffraction elements".

Figure 4:
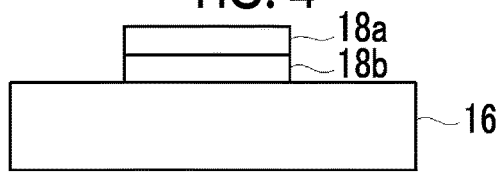
FIG. 4 is a diagram showing an example of disposition of diffraction elements.
Figure 5:
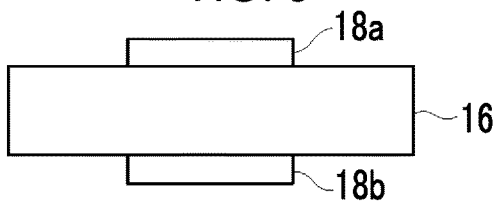
FIG. 5 is a diagram showing another example of the disposition of the diffraction elements.

In the example shown in FIG. 1, the first incidence diffraction element 18a and the second incidence diffraction element 18b are disposed substantially at a center position of the main surface of the light guide plate 16 in the left-right direction on the upper side in FIG. 1. The first incidence diffraction element 18a and the second incidence diffraction element 18b are disposed to overlap each other in the plane direction. In a case where the first incidence diffraction element 18a and the second incidence diffraction element 18b are disposed to overlap each other in the plane direction, the first incidence diffraction element 18a and the second incidence diffraction element 18b may be laminated and disposed as shown in FIG. 4, or the first incidence diffraction element 18a and the second incidence diffraction element 18b may be disposed on different main surfaces of the light guide plate 16 as shown in FIG. 5.

The first incidence diffraction element 18a and the second incidence diffraction element 18b diffract light components having different wavelengths. Accordingly, the period of the diffraction structure of the first incidence diffraction element 18a and the period of the diffraction structure of the second incidence diffraction element 18b are different from each other.

The first incidence diffraction element 18a and the second incidence diffraction element 18b diffract light components having different wavelengths emitted from the display element 12 in different directions. In the example shown in FIG. 1, the first incidence diffraction element 18a diffracts incident light in the left direction in which the first intermediate diffraction element 20a is disposed. Accordingly, the diffraction structure of the first incidence diffraction element 18a has a configuration in which the pattern is arranged in the left-right direction as indicated by S1A in FIG. 1.

On the other hand, the second incidence diffraction element 18b diffracts incident light in the right direction in which the second intermediate diffraction element 20b is disposed. Accordingly, the diffraction structure of the second incidence diffraction element 18b has a configuration in which the pattern is arranged in the left-right direction as indicated by SiB in FIG. 1.

In the example shown in FIG. 1, each of the pattern (S1A) of the diffraction structure in the first incidence diffraction element 18a and the pattern (SIB) of the diffraction structure in the second incidence diffraction element 18b is partially shown, and the pattern of the diffraction structure is actually formed over the entire surface of the incidence diffraction element. Regarding this point, the same can be applied to the intermediate diffraction element and the emission diffraction element.

In a case where the first incidence diffraction element 18a and the second incidence diffraction element 18b are disposed at the position where they overlap each other in the plane direction as in the example shown in FIG. 1, it is preferable that the first incidence diffraction element 18a and the second incidence diffraction element 18b have wavelength selectivity of diffracting only light having a specific wavelength. The first incidence diffraction element 18a and the second incidence diffraction element 18b do not need to have the wavelength selectivity.

(Intermediate Diffraction Element)

The first intermediate diffraction element 20a diffracts light that is diffracted by the first incidence diffraction element 18a and propagates in the light guide plate 16 to the first emission diffraction element 24a.

The second intermediate diffraction element 20b diffracts light that is diffracted by the second incidence diffraction element 18b and propagates in the light guide plate 16 to the second emission diffraction element 24b.

In the following description, in a case where the first intermediate diffraction element 20a and the second intermediate diffraction element 20b do not need to be distinguished from each other, they will also be collectively referred to as "intermediate diffraction elements".

In the example shown in FIG. 1, the first intermediate diffraction element 20a is disposed at a position of the main surface of the light guide plate 16 on the left side of the first incidence diffraction element 18a and the second incidence diffraction element 18b in FIG. 1. In addition, the second intermediate diffraction element 20b is disposed at a position of the main surface of the light guide plate 16 on the right side of the first incidence diffraction element 18a and the second incidence diffraction element 18b in FIG. 1.

The first intermediate diffraction element 20a and the second intermediate diffraction element 20b diffract light components having different wavelengths. Accordingly, the period of the diffraction structure of the first intermediate diffraction element 20a and the period of the diffraction structure of the second intermediate diffraction element 20b are different from each other.

In the example shown in FIG. 1, the first intermediate diffraction element 20a diffracts the light that is diffracted by the first incidence diffraction element 18a and guided into the light guide plate 16 in the lower right direction in which the first emission diffraction element 24a is disposed. Accordingly, the diffraction structure of the first intermediate diffraction element 20a has a configuration in which the pattern is arranged in an oblique direction (the arrangement direction of the pattern is the lower right direction) as indicated by S2A in FIG. 1.

The second intermediate diffraction element 20b diffracts the light that is diffracted by the second incidence diffraction element 18b and guided into the light guide plate 16 in the lower left direction in which the second emission diffraction element 24b is disposed. Accordingly, the diffraction structure of the second intermediate diffraction element 20b has a configuration in which the pattern is arranged in an oblique direction (the arrangement direction of the pattern is the lower left direction) as indicated by S2B in FIG. 1.

(Emission Diffraction Element)

The first emission diffraction element 24a emits the light that is diffracted by the first incidence diffraction element 18a and the first intermediate diffraction element 20a and propagates in the light guide plate 16 from the light guide plate 16.

The second emission diffraction element 24b emits the light that is diffracted by the second incidence diffraction element 18b and the second intermediate diffraction element 20b and propagates in the light guide plate 16 from the light guide plate 16.

In the following description, in a case where the first emission diffraction element 24a and the second emission diffraction element 24b do not need to be distinguished from each other, they will also be collectively referred to as "emission diffraction elements".

In the example shown in FIG. 1, the first emission diffraction element 24a and the second emission diffraction element 24b are disposed at positions of the main surface of the light guide plate 16 below the first incidence diffraction element 18a and the second incidence diffraction element 18b in FIG. 1. The first emission diffraction element 24a and the second emission diffraction element 24b are disposed to overlap each other in the plane direction. In a case where the first emission diffraction element 24a and the second emission diffraction element 24b are disposed to overlap each other in the plane direction, as in the case of the incidence diffraction elements, the first emission diffraction element 24a and the second emission diffraction element 24b may be laminated and disposed, or the first emission diffraction element 24a and the second emission diffraction element 24b may be disposed on different main surfaces of the light guide plate 16.

The first emission diffraction element 24a and the second emission diffraction element 24b diffract light components having different wavelengths. Accordingly, the period of the diffraction structure of the first emission diffraction element 24a and the period of the diffraction structure of the second emission diffraction element 24b are different from each other.

In the example shown in FIG. 1, the first emission diffraction element 24a diffracts the light that is diffracted by the first intermediate diffraction element 20a and guided into the light guide plate 16 in a direction perpendicular to the plane of FIG. 1. Accordingly, the diffraction structure of the first emission diffraction element 24a has a configuration in which the pattern is arranged in an oblique direction (the arrangement direction of the pattern is the lower right direction) as indicated by S3A in FIG. 1.

The second emission diffraction element 24b diffracts the light that is diffracted by the second intermediate diffraction element 20b and guided into the light guide plate 16 in a direction perpendicular to the plane of FIG. 1. Accordingly, the diffraction structure of the second emission diffraction element 24b has a configuration in which the pattern is arranged in an oblique direction (the arrangement direction of the pattern is the lower left direction) as indicated by S3B in FIG. 1.

Here, as shown in FIG. 1, in the light guide element 14 according to the embodiment of the present invention, the arrangement direction (hereinafter, also referred to as "periodic direction") of the pattern in the diffraction structure of the first emission diffraction element 24a intersects with the periodic direction of the diffraction structure of the second emission diffraction element 24b. As a result, the occurrence of multiple images can be suppressed.

This point will be described below.

Figure 23:
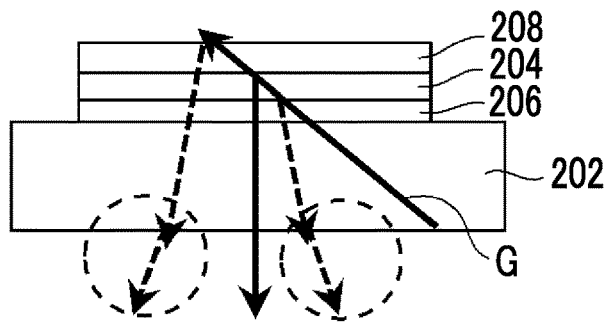
FIG. 23 is a diagram showing the occurrence of multiple images.

In the light guide element used for AR glasses or the like, for example, the three RGB images are emitted from the display, each of the light components is diffracted and guided into a light guide plate and is emitted from the light guide plate to an observation position of a user by a diffraction element such that such that the three color images overlap each other and are displayed. As a result, in a case where emission side diffraction elements corresponding to the respective RGB colors are disposed to overlap each other during the display of the color image, for example, as shown in FIG. 23, G light is diffracted by a G diffraction element 204 for diffracting G light, and a part of the G light is also diffracted by a R diffraction element 206 for diffracting R light and/or a B diffraction element 208 for diffracting B light. At this time, the G diffraction element 204, the R diffraction element 206, and the B diffraction element 208 are different from each other in the period of the diffraction structure. Therefore, the G light diffracted by the G diffraction element 204, the G light diffracted by the R diffraction element 206, and the G light diffracted by the B diffraction element 208 are diffracted at different angles. As a result, multiple images are visually recognized.

On the other hand, in the light guide element according to the embodiment of the present invention, the periodic direction of the diffraction structure of the first emission diffraction element 24a and the periodic direction of the diffraction structure of the second emission diffraction element 24b are disposed to intersect with each other. For example, the light having a wavelength that is diffracted by the first emission diffraction element 24a is incident into the diffraction structure of the second emission diffraction element 24b in a direction in which diffraction is not likely to occur. Therefore, the light having a wavelength that is diffracted by the first emission diffraction element 24a can be suppressed from being diffracted by the second emission diffraction element 24b, and the occurrence of multiple images can be suppressed. Likewise, the light having a wavelength that is diffracted by the second emission diffraction element 24b is incident into the diffraction structure of the first emission diffraction element 24a in a direction in which diffraction is not likely to occur. Therefore, the light having a wavelength that is diffracted by the second emission diffraction element 24b can be suppressed from being diffracted by the first emission diffraction element 24a, and the occurrence of multiple images can be suppressed.

From the viewpoint that the occurrence of multiple images can be more suitably suppressed, an angle (intersecting angle) between the periodic direction of the diffraction structure of the first emission diffraction element 24a and the periodic direction of the diffraction structure of the second emission diffraction element 24b is preferably 30° to 180°, more preferably 60° to 180°, and more preferably 80° to 180°.

Here, regarding the periodic direction of the diffraction structure of the emission diffraction element, in a case where the emission diffraction elements are disposed on the light guide plate and the light is incident from the normal direction of the emission diffraction elements, the periodic direction of the diffraction structure having a higher diffracted light intensity of the light diffracted in the light guide plate is set as a 0° periodic direction, and the periodic direction of the diffraction structure having a lower diffraction intensity is set as a 180° periodic direction. An angle between the periodic directions of the diffraction structures refers to an angle between the 0° periodic direction of the diffraction structure of the first emission diffraction element 24a and the 0° periodic direction of the diffraction structure of the second emission diffraction element 24b.

Although not shown in the drawing, the first incidence diffraction element 18a, the second incidence diffraction element 18b, the first intermediate diffraction element 20a, the second intermediate diffraction element 20b, the first emission diffraction element 24a, and the second emission diffraction element 24b are bonded to the light guide plate using a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the first incidence diffraction element 18a, the second incidence diffraction element 18b, the first intermediate diffraction element 20a, the second intermediate diffraction element 20b, the first emission diffraction element 24a, the second emission diffraction element 24b, and the light guide plate 16 may be laminated and held by a frame, a holding device, or the like to configure the light guide element according to the embodiment of the present invention.

Further, the first incidence diffraction element 18a, the second incidence diffraction element 18b, the first intermediate diffraction element 20a, the second intermediate diffraction element 20b, the first emission diffraction element 24a, and the second emission diffraction element 24b may be directly formed on the light guide plate 16.

In addition, in a case where the period of the diffraction structure of the first incidence diffraction element is represented by $\Lambda_{i1}$, the period of the diffraction structure of the second incidence diffraction element is represented by $\Lambda_{i2}$, the period of the diffraction structure of the first intermediate diffraction element is represented by $\Lambda_{e1}$, the period of the diffraction structure of the second intermediate diffraction element is represented by $\Lambda_{e2}$, the period of the diffraction structure of the first emission diffraction element is represented by $\Lambda_{o1}$, and the period of the diffraction structure of the second emission diffraction element is represented by $\Lambda_{o2}$, it is preferable that $\Lambda_{e1} \leq \Lambda_{i1}$, $\Lambda_{e1} \leq \Lambda_{o1}$, $\Lambda_{e1} \leq \Lambda_{i2}$, and $\Lambda_{e2} \leq \Lambda_{o2}$ are satisfied. That is, it is preferable that the period of the diffraction structure of the intermediate diffraction element is lower than those of the incidence diffraction element and the emission diffraction element.

By setting the period of the diffraction structure of the intermediate diffraction element to be lower than those of the incidence diffraction element and the emission diffraction element, light can suitably penetrate from the incidence diffraction element to the emission diffraction element through the intermediate diffraction element, and light can be appropriately emitted from the light guide plate to the user.

The period of the diffraction structure of the incidence diffraction element, the period of the diffraction structure of the intermediate diffraction element, and the period of the diffraction structure of the emission diffraction element are not particularly limited and may be appropriately set depending on the positional relationship of each of the diffraction elements and the like.

The periods of the diffraction structures of the first incidence diffraction element 18a, the second incidence diffraction element 18b, the first emission diffraction element 24a, and the second emission diffraction element 24b are preferably 1 μm or less, more preferably 0.8 μm or less, and still more preferably a wavelength λ or less of incident light from the viewpoint of propagating light in the light guide plate 16 by total reflection.

Here, in the example shown in FIG. 1, the first incidence diffraction element 18a and the second incidence diffraction element 18b may be configured to overlap each other in the plane direction and are not particularly limited thereto. For example, as in the example shown in FIG. 6, the first incidence diffraction element 18a and the second incidence diffraction element 18b may be configured to be disposed at positions where they do not overlap each other in the plane direction.

Figure 6:
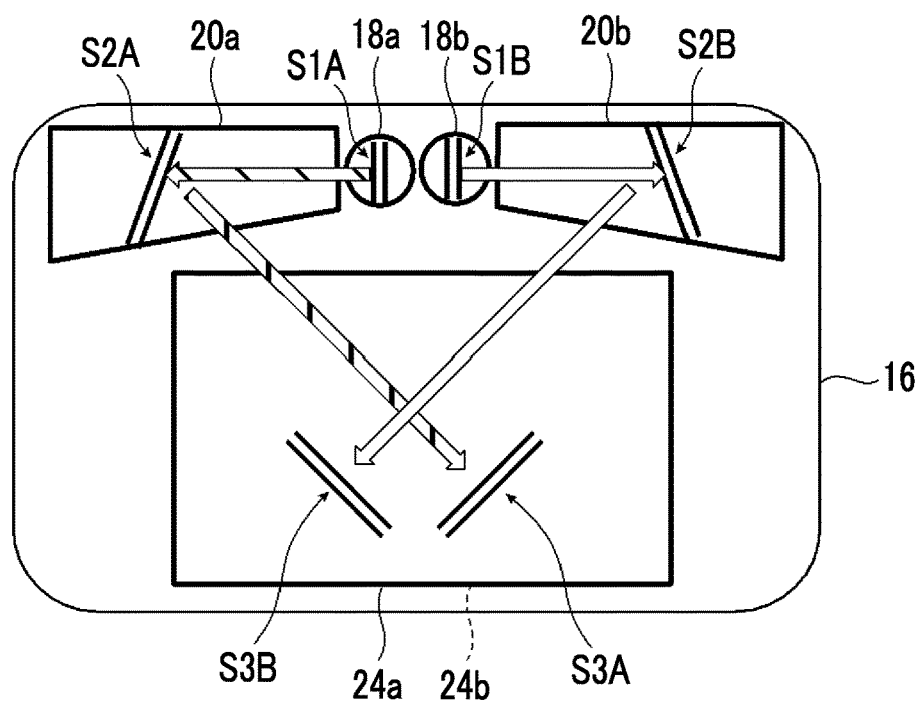
FIG. 6 is a front view conceptually showing another example of the light guide element according to the embodiment of the present invention.

In the example shown in FIG. 6, the first incidence diffraction element 18a is disposed substantially at a position of the main surface of the light guide plate 16 on the left side from substantially the center in the left-right direction on the upper side in FIG. 1. The second incidence diffraction element 18b is disposed substantially at a position of the main surface of the light guide plate 16 on the right side from substantially the center in the left-right direction on the upper side in FIG. 1.

The disposition of the first intermediate diffraction element 20a and the second intermediate diffraction element 20b and the disposition of the first emission diffraction element 24a and the second emission diffraction element 24b are basically the same as those of FIG. 1.

In the configuration shown in FIG. 6, as described above, it is preferable that the image display apparatus is configured to include two display elements including: a display element that emits a monochromic image formed of light having a wavelength to be diffracted by the first incidence diffraction element 18a to the first incidence diffraction element 18a; and a display element that emits a monochromic image formed of light having a wavelength to be diffracted by the second incidence diffraction element 18b to the second incidence diffraction element 18b.

In addition, as in the example shown in FIG. 6, in the configuration in which the first incidence diffraction element 18a and the second incidence diffraction element 18b may be configured to be disposed at positions where they do not overlap each other in the plane direction, a diffraction element not having wavelength selectivity can also be suitably used as the first incidence diffraction element 18a and the second incidence diffraction element 18b.

In addition, in the configuration of the example shown in FIG. 1, the two incidence diffraction elements, the two intermediate diffraction elements, and the two emission diffraction elements are provided. However, the present invention is not limited to this configuration, and three or more incidence diffraction elements, three or more intermediate diffraction elements, and three or more diffraction elements may be provided.

Figure 7:
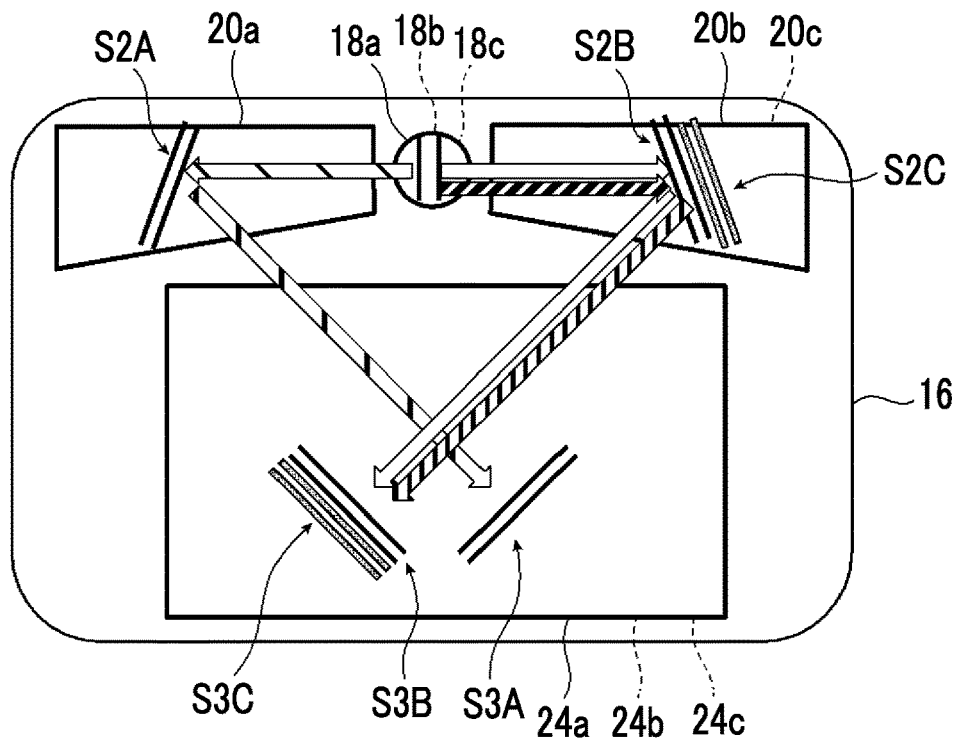
FIG. 7 is a front view conceptually showing still another example of the light guide element according to the embodiment of the present invention.

For example, in the example shown in FIG. 7, a light guide element 14b includes the first incidence diffraction element 18a, the second incidence diffraction element 18b, a third incidence diffraction element 18c, the first intermediate diffraction element 20a, the second intermediate diffraction element 20b, a third intermediate diffraction element 20c, the first emission diffraction element 24a, the second emission diffraction element 24b, and a third emission diffraction element 24c that are provided on the main surface of the light guide plate 16.

In FIG. 7, the first incidence diffraction element 18a, the second incidence diffraction element 18b, the first intermediate diffraction element 20a, the second intermediate diffraction element 20b, the first emission diffraction element 24a, and the second emission diffraction element 24b have the same configuration and disposition as those of FIG. 1.

In FIG. 7, the third incidence diffraction element 18c is disposed at the same position as the second incidence diffraction element 18b in the plane direction. In addition, the third intermediate diffraction element 20c is disposed at the same position as the second intermediate diffraction element 20b in the plane direction. In addition, the third emission diffraction element 24c is disposed at the same position as the first emission diffraction element 24a and the second emission diffraction element 24b in the plane direction.

The third incidence diffraction element 18c diffracts light having a wavelength different from those of the first incidence diffraction element 18a and the second incidence diffraction element 18b. Accordingly, a period of a diffraction structure of the third incidence diffraction element 18c is different from the periods of the diffraction structures of the first incidence diffraction element 18a and the second incidence diffraction element 18b.

In addition, the disposition position of the third incidence diffraction element 18c in the plane direction overlaps that of the second incidence diffraction element 18b, and the third incidence diffraction element 18c diffracts light in the same direction as the second incidence diffraction element 18b (the direction of the third intermediate diffraction element 20c). That is, the third incidence diffraction element 18c diffracts light in a direction different from that of the first incidence diffraction element 18a.

In the example shown in FIG. 7, the third incidence diffraction element 18c diffracts incident light in the right direction in which the third intermediate diffraction element 20c is disposed. Accordingly, the diffraction structure of the third incidence diffraction element 18c has a configuration in which the pattern is arranged in the left-right direction as indicated by S1C in FIG. 7.

The third intermediate diffraction element 20c diffracts light having a wavelength different from those of the first intermediate diffraction element 20a and the second intermediate diffraction element 20b. Accordingly, a period of a diffraction structure of the third intermediate diffraction element 20c is different from the periods of the diffraction structures of the first intermediate diffraction element 20a and the second intermediate diffraction element 20b.

In addition, the disposition position of the third intermediate diffraction element 20c in the plane direction overlaps that of the second intermediate diffraction element 20b, and the third intermediate diffraction element 20c diffracts light in the same direction as the second intermediate diffraction element 20b (the direction of the third emission diffraction element 24c).

In the example shown in FIG. 7, the third intermediate diffraction element 20c diffracts the light that is diffracted by the third incidence diffraction element 18c and guided into the light guide plate 16 in the lower left direction in which the third emission diffraction element 24c is disposed. Accordingly, the diffraction structure of the third intermediate diffraction element 20c has a configuration in which the pattern is arranged in an oblique direction (the arrangement direction of the pattern is the lower left direction) as indicated by S2C in FIG. 7.

The third emission diffraction element 24c diffracts light having a wavelength different from those of the first emission diffraction element 24a and the second emission diffraction element 24b. Accordingly, a period of a diffraction structure of the third emission diffraction element 24c is different from the periods of the diffraction structures of the first emission diffraction element 24a and the second emission diffraction element 24b.

In addition, the disposition position of the third emission diffraction element 24c in the plane direction overlaps the first emission diffraction element 24a and the second emission diffraction element 24b.

In the example shown in FIG. 7, the third emission diffraction element 24c diffracts the light that is diffracted by the third intermediate diffraction element 20c and guided into the light guide plate 16 in a direction perpendicular to the plane of FIG. 7. Accordingly, the diffraction structure of the third emission diffraction element 24c has a configuration in which the pattern is arranged in an oblique direction (the arrangement direction of the pattern is the lower left direction) as indicated by S3C in FIG. 7.

In an image display apparatus including the light guide element 14b shown in FIG. 7, images (light components corresponding to the images) displayed by the display element are diffracted to be incident into the light guide plate 16 by the first incidence diffraction element 18a, the second incidence diffraction element 18b, and the third incidence diffraction element 18c per predetermined wavelength range. The diffracted light by the first incidence diffraction element 18a is totally reflected and propagates in the light guide plate 16 such that the diffracted light is incident into the first intermediate diffraction element 20a. The light incident into the first intermediate diffraction element 20a is diffract to the first emission diffraction element 24a, is totally reflected and propagates in the light guide plate 16 to be incident into the first emission diffraction element 24a, and is diffracted by the first emission diffraction element 24a to be emitted from the light guide plate 16. In addition, the diffracted light by the second incidence diffraction element 18b is totally reflected and propagates in the light guide plate 16 such that the diffracted light is incident into the second intermediate diffraction element 20b. The light incident into the second intermediate diffraction element 20b is diffract to the second emission diffraction element 24b, is totally reflected and propagates in the light guide plate 16 to be incident into the second emission diffraction element 24b, and is diffracted by the second emission diffraction element 24b to be emitted from the light guide plate 16. In addition, the diffracted light by the third incidence diffraction element 18c is totally reflected and propagates in the light guide plate 16 such that the diffracted light is incident into the third intermediate diffraction element 20c. The light incident into the third intermediate diffraction element 20c is diffracted to the third emission diffraction element 24c, is totally reflected and propagates in the light guide plate 16, is incident into the third emission diffraction element 24c, is diffracted by the third emission diffraction element 24c, and is emitted from the light guide plate 16.

The first emission diffraction element 24a, the second emission diffraction element 24b, and the third emission diffraction element 24c are disposed to overlap each other in the plane direction. Therefore, the light components diffracted and emitted by the first emission diffraction element 24a, the second emission diffraction element 24b, and the third emission diffraction element 24c are emitted from the light guide plate 16 at the same position and are provided for observation of the user U. As a result, three colors can be displayed.

In this configuration, the periodic direction of the diffraction structure of the third emission diffraction element 24c intersects with the periodic direction of the diffraction structure of the first emission diffraction element 24a. Therefore, the light having a wavelength that is diffracted by the first emission diffraction element 24a can be suppressed from being diffracted by the third emission diffraction element 24c. In addition, the light having a wavelength that is diffracted by the third emission diffraction element 24c can be suppressed from being diffracted by the first emission diffraction element 24a, and the occurrence of multiple images can be suppressed.

Here, in the example shown in FIG. 7, the disposition positions of the second incidence diffraction element 18b, the third incidence diffraction element 18c, the second intermediate diffraction element 20b, and the third intermediate diffraction element 20c in the plane direction overlap each other. Therefore, the periodic direction of the diffraction structure of the third emission diffraction element 24c and the periodic direction of the diffraction structure of the second emission diffraction element 24b substantially match each other. Therefore, the light having a wavelength that is diffracted by the second emission diffraction element 24b is diffracted by the third emission diffraction element 24c, and multiple images may occur. In addition, the light having a wavelength that is diffracted by the third emission diffraction element 24c is diffracted by the second emission diffraction element 24b, and multiple images may occur.

In the configuration shown in FIG. 7, from the viewpoint of suppressing the occurrence of multiple images, it is preferable that a difference between the wavelength of light diffracted by the second emission diffraction element 24b and the wavelength of light diffracted by the third emission diffraction element 24c is large. Accordingly, in a case where a three-color image is displayed, it is preferable that light having an intermediate wavelength is diffracted by the first emission diffraction element 24a, and each of light components on a shorter wavelength side and on a longer wavelength side is diffracted by the second emission diffraction element 24b or the third emission diffraction element 24c.

From the above-described viewpoint, in a case where the period of the diffraction structure of the first emission diffraction element is represented by $\Lambda_{o1}$, the period of the diffraction structure of the second emission diffraction element is represented by $\Lambda_{o2}$, and the period of the diffraction structure of the third emission diffraction element is represented by $\Lambda_{o3}$, it is preferable that $\Lambda_{o3} \leq \Lambda_{o1} \leq \Lambda_{o2}$ is satisfied. Accordingly, in a case where the period of the diffraction structure of the first incidence diffraction element is represented by $\Lambda_{i1}$, the period of the diffraction structure of the second incidence diffraction element is represented by $\Lambda_{i2}$, and the period of the diffraction structure of the third incidence diffraction element is represented by $\Lambda_{i3}$, it is preferable that $\Lambda_{i3} \leq \Lambda_{i1} \leq \Lambda_{i2}$ is satisfied.

In addition, in the configuration shown in FIG. 7, from the viewpoint of suppressing the occurrence of multiple images, it is also preferable that each of the second incidence diffraction element 18b, the third incidence diffraction element 18c, the second intermediate diffraction element 20b, the third intermediate diffraction element 20c, the second emission diffraction element 24b, and the third emission diffraction element 24c has wavelength selectivity.

In addition, in the example shown in FIG. 7, the first incidence diffraction element 18a, the second incidence diffraction element 18b, and the third incidence diffraction element 18c are disposed to overlap each other in the plane direction, but the present invention is not limited thereto. For example, as in the example shown in FIG. 8, the first incidence diffraction element 18a, the second incidence diffraction element 18b, and the third incidence diffraction element 18c may be configured to be disposed at positions where they do not overlap each other in the plane direction. That is, only the second incidence diffraction element 18b and the third incidence diffraction element 18c may overlap each other in the plane direction.

Figure 8:
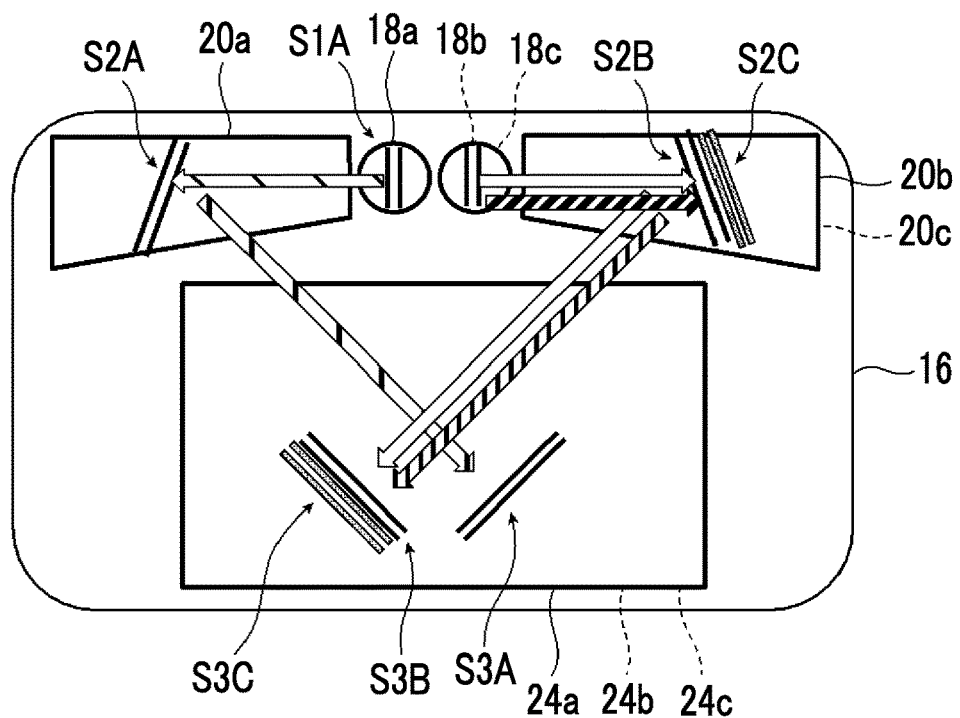
FIG. 8 is a front view conceptually showing still another example of the light guide element according to the embodiment of the present invention.

In the example shown in FIG. 8, the first incidence diffraction element 18a is disposed substantially at a position of the main surface of the light guide plate 16 on the left side from substantially the center in the left-right direction on the upper side in FIG. 8. The second incidence diffraction element 18b and the third incidence diffraction element 18c are disposed substantially at a position of the main surface of the light guide plate 16 on the right side from substantially the center in the left-right direction on the upper side in FIG. 8. The configuration of FIG. 8 has the same configuration as that of FIG. 7, except that the disposition of the incidence diffraction elements is different from that of FIG. 7.

Figure 9:
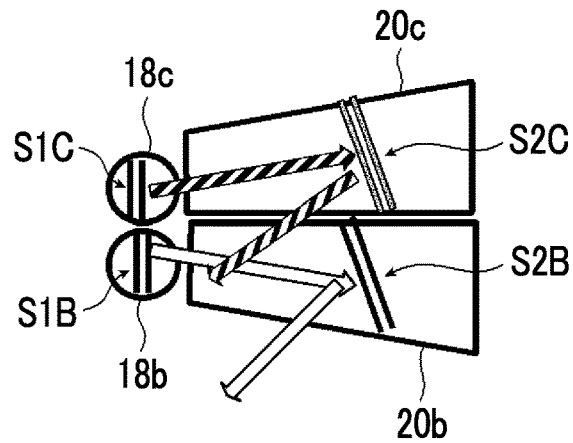
FIG. 9 is a diagram showing still another example of the light guide element according to the embodiment of the present invention.

In addition, in the example shown in FIG. 8, the second incidence diffraction element 18b, the third incidence diffraction element 18c, the second intermediate diffraction element 20b, and the third intermediate diffraction element 20c are disposed to overlap each other in the plane direction, but the present invention is not limited thereto. For example, as shown in FIG. 9, the second incidence diffraction element 18b, the third incidence diffraction element 18c, the second intermediate diffraction element 20b, and the third intermediate diffraction element 20c are disposed at different positions in the up-down direction in FIG. 9 not to overlap each other in the plane direction.

Even in this configuration, a direction from the second intermediate diffraction element 20b to the emission diffraction element and a direction from the third intermediate diffraction element 20c to the emission diffraction element substantially match each other. Therefore, the periodic direction of the diffraction structure of the third emission diffraction element 24c and the periodic direction of the diffraction structure of the second emission diffraction element 24b substantially match each other. Therefore, as described above, it is preferable that each of light components on a shorter wavelength side and on a longer wavelength side is diffracted by the second emission diffraction element 24b or the third emission diffraction element 24c. Alternatively, it is also preferable that each of the second emission diffraction element 24b and the third emission diffraction element 24c has wavelength selectivity.

Figure 10:
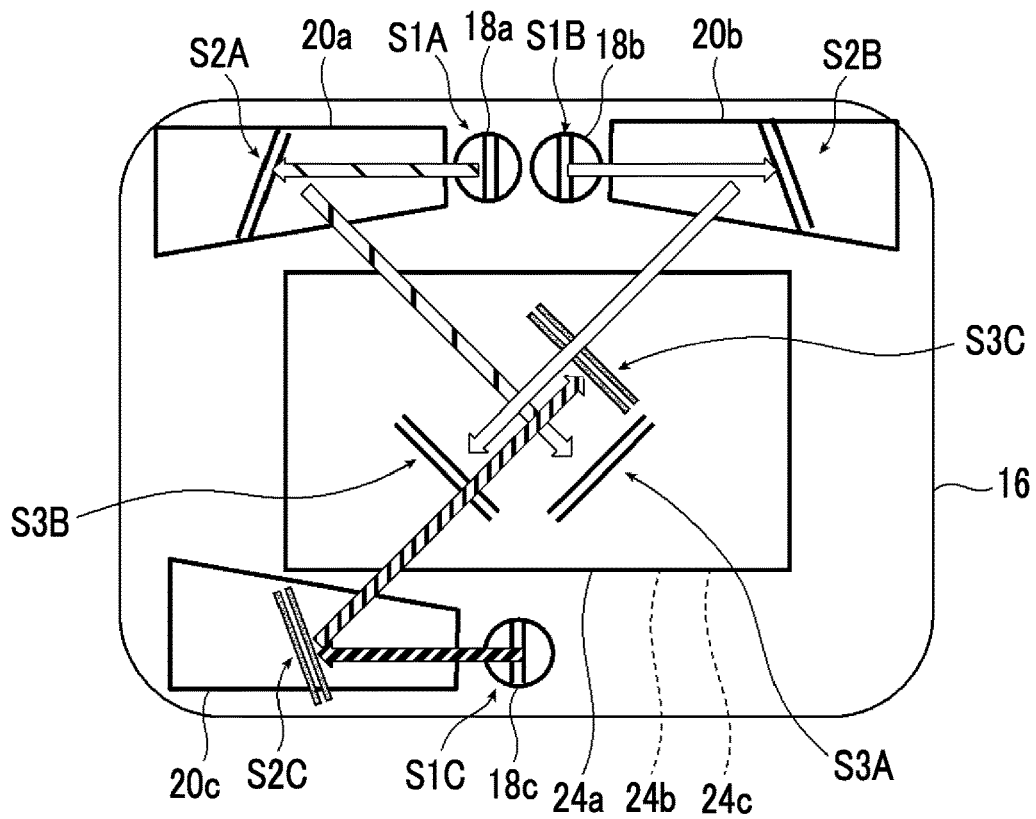
FIG. 10 is a front view conceptually showing still another example of the light guide element according to the embodiment of the present invention.

Alternatively, as in the example shown in FIG. 10, the third incidence diffraction element 18c and the third intermediate diffraction element 20c may be disposed below the emission diffraction element in FIG. 10. In FIG. 10, the third incidence diffraction element 18c is disposed substantially at a center position of the main surface of the light guide plate 16 in the left-right direction on the lower side in FIG. 10. The third intermediate diffraction element 20c is disposed at a position of the main surface of the light guide plate 16 on the left side of the third incidence diffraction element 18c in FIG. 10.

Even in this configuration, a direction from the second intermediate diffraction element 20b to the emission diffraction element and a direction from the third intermediate diffraction element 20c to the emission diffraction element are opposite to each other, but the periodic directions of diffracted images thereof substantially match each other. Therefore, as described above, it is preferable that each of light components on a shorter wavelength side and on a longer wavelength side is diffracted by the second emission diffraction element 24b or the third emission diffraction element 24c. Alternatively, it is also preferable that each of the second emission diffraction element 24b and the third emission diffraction element 24c has wavelength selectivity.

In addition, in the configuration of the example shown in FIG. 1 or the like, the intermediate diffraction elements are provided. However, the light guide element according to the embodiment of the present invention is not limited to this configuration. The light guide element may have a configuration in which light that is diffracted by the incidence diffraction element and guided into the light guide plate is diffracted by the emission diffraction element to be emitted from the light guide plate without providing the intermediate diffraction element.

Figure 11:
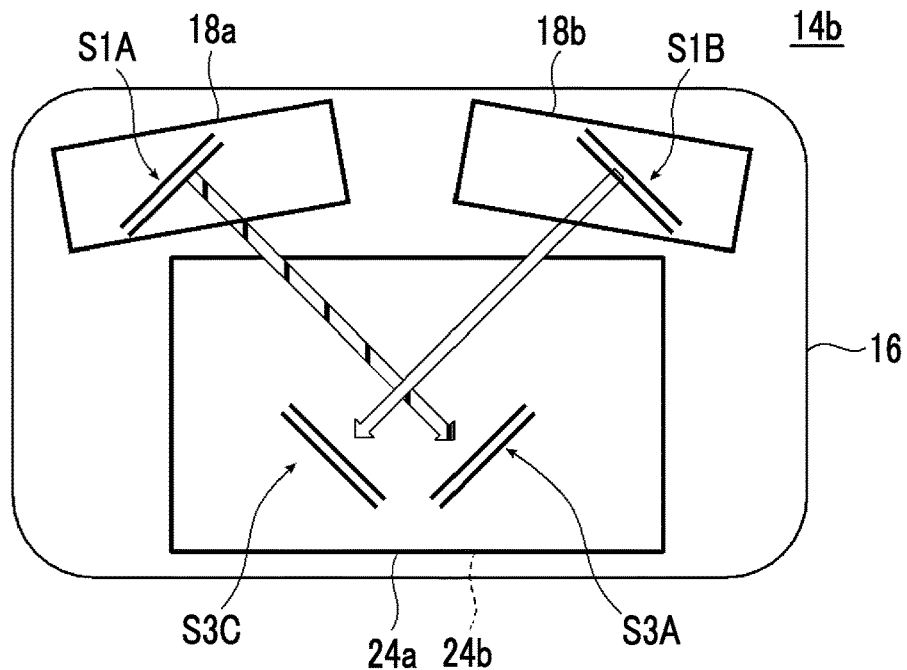
FIG. 11 is a front view conceptually showing still another example of the light guide element according to the embodiment of the present invention.

An light guide element shown in FIG. 11 includes: the light guide plate 16; and the first incidence diffraction element 18a, the second incidence diffraction element 18b, the first emission diffraction element 24a, and the second emission diffraction element 24b that are provided on the light guide plate 16.

The first incidence diffraction element 18a and the second incidence diffraction element 18b diffract light emitted from the display element to be incident into the light guide plate 16.

The first incidence diffraction element 18a is disposed substantially at a position of the main surface of the light guide plate 16 on the upper left side in FIG. 11. The second incidence diffraction element 18b is disposed substantially at a position of the main surface of the light guide plate 16 on the upper right side in FIG. 11. That is, the first incidence diffraction element 18a and the second incidence diffraction element 18b are disposed at different positions in the plane direction.

The first incidence diffraction element 18a and the second incidence diffraction element 18b diffract light components having different wavelengths emitted from the display element in different directions. In the example shown in FIG. 11, the first incidence diffraction element 18a diffracts incident light in the lower right direction in which the emission diffraction element is disposed. Accordingly, the diffraction structure of the first incidence diffraction element 18a has a configuration in which the pattern is arranged in the lower right direction as indicated by S1A in FIG. 11. The second incidence diffraction element 18b diffracts incident light in the lower left direction in which the emission diffraction element is disposed. Accordingly, the diffraction structure of the second incidence diffraction element 18b has a configuration in which the pattern is arranged in the lower left direction as indicated by S1B in FIG. 11.

The first emission diffraction element 24a emits light that is diffracted by the first incidence diffraction element 18a and propagates in the light guide plate 16 from the light guide plate 16.

The second emission diffraction element 24b emits light that is diffracted by the second incidence diffraction element 18b and propagates in the light guide plate 16 from the light guide plate 16.

The first emission diffraction element 24a and the second emission diffraction element 24b are disposed at positions of the main surface of the light guide plate 16 below the first incidence diffraction element 18a and the second incidence diffraction element 18b in FIG. 11. The first emission diffraction element 24a and the second emission diffraction element 24b are disposed to overlap each other in the plane direction.

In the example shown in FIG. 11, the first emission diffraction element 24a diffracts the light that is diffracted by the first incidence diffraction element 18a and guided into the light guide plate 16 in a direction perpendicular to the plane of FIG. 11. Accordingly, the diffraction structure of the first emission diffraction element 24a has a configuration in which the pattern is arranged in an oblique direction (the arrangement direction of the pattern is the lower right direction) as indicated by S3A in FIG. 11.

The second emission diffraction element 24b diffracts the light that is diffracted by the second incidence diffraction element 18b and guided into the light guide plate 16 in a direction perpendicular to the plane of FIG. 11. Accordingly, the diffraction structure of the second emission diffraction element 24b has a configuration in which the pattern is arranged in an oblique direction (the arrangement direction of the pattern is the lower left direction) as indicated by S3B in FIG. 11.

That is, the periodic direction of the diffraction structure of the first emission diffraction element 24a and the periodic direction of the diffraction structure of the second emission diffraction element 24b intersect with each other. As a result, as in the case where the intermediate diffraction element is provided as shown in FIG. 1 or the like, the occurrence of multiple images can be suppressed.

In a case where the periodic direction of the diffraction structure of the first emission diffraction element 24a and the periodic direction of the diffraction structure of the second emission diffraction element 24b are disposed to intersect with each other, light needs to be incident from different directions into the first emission diffraction element 24a and the second emission diffraction element 24b disposed at the same position in the plane direction. Accordingly, in the configuration in which light is guided into the emission diffraction element directly from the position of the incidence diffraction element without providing the intermediate diffraction element, the first incidence diffraction element 18a and the second incidence diffraction element 18b are disposed at different positions in the plane direction.

Here, in the configuration of the example shown in FIG. 11, the two incidence diffraction elements and the two emission diffraction elements are provided. However, the present invention is not limited to this configuration, and three or more incidence diffraction elements and three or more diffraction elements may be provided.

Figure 12:
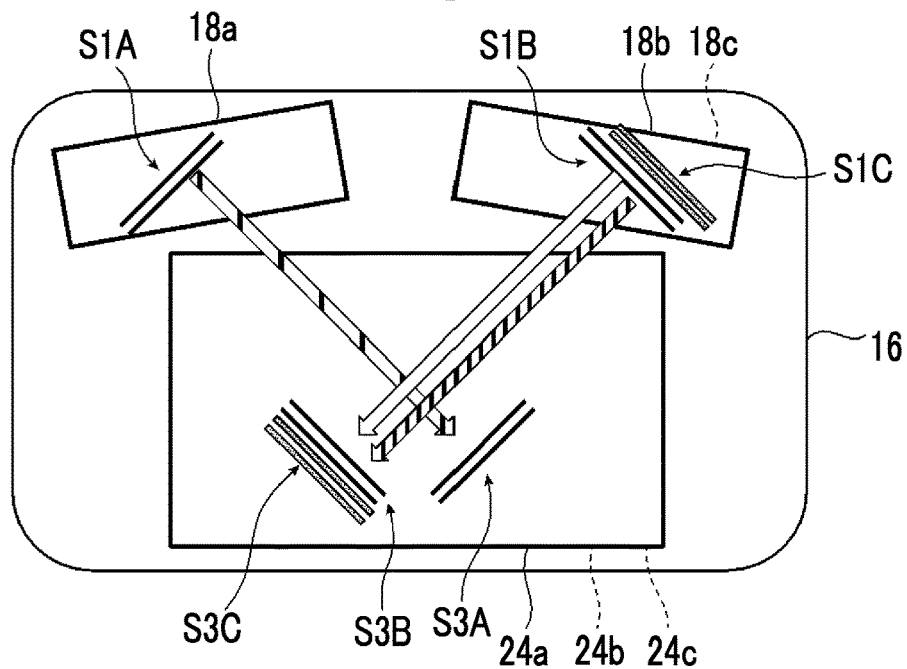
FIG. 12 is a front view conceptually showing still another example of the light guide element according to the embodiment of the present invention.

For example, in the example shown in FIG. 12, the light guide element includes the first incidence diffraction element 18a, the second incidence diffraction element 18b, the third incidence diffraction element 18c, the first emission diffraction element 24a, the second emission diffraction element 24*b*, and the third emission diffraction element 24*c* that are provided on the main surface of the light guide plate 16.

In FIG. 12, the first incidence diffraction element 18*a*, the second incidence diffraction element 18*b*, the first emission diffraction element 24*a*, and the second emission diffraction element 24*b* have the same configuration and disposition as those of FIG. 11.

In FIG. 12, the third incidence diffraction element 18*c* is disposed at the same position as the second incidence diffraction element 18*b* in the plane direction. In addition, the third emission diffraction element 24*c* is disposed at the same position as the first emission diffraction element 24*a* and the second emission diffraction element 24*b* in the plane direction.

The third incidence diffraction element 18*c* diffracts light having a wavelength different from those of the first incidence diffraction element 18*a* and the second incidence diffraction element 18*b*. Accordingly, a period of a diffraction structure of the third incidence diffraction element 18*c* is different from the periods of the diffraction structures of the first incidence diffraction element 18*a* and the second incidence diffraction element 18*b*.

In addition, the disposition position of the third incidence diffraction element 18*c* in the plane direction overlaps that of the second incidence diffraction element 18*b*, and the third incidence diffraction element 18*c* diffracts light in the same direction as the second incidence diffraction element 18*b*. That is, the third incidence diffraction element 18*c* diffracts light in a direction different from that of the first incidence diffraction element 18*a*.

The third emission diffraction element 24*c* diffracts light having a wavelength different from those of the first emission diffraction element 24*a* and the second emission diffraction element 24*b*. Accordingly, a period of a diffraction structure of the third emission diffraction element 24*c* is different from the periods of the diffraction structures of the first emission diffraction element 24*a* and the second emission diffraction element 24*b*.

In addition, the disposition position of the third emission diffraction element 24*c* in the plane direction overlaps the first emission diffraction element 24*a* and the second emission diffraction element 24*b*.

In the example shown in FIG. 12, the third emission diffraction element 24*c* diffracts the light that is diffracted by the third incidence diffraction element 18*c* and guided into the light guide plate 16 in a direction perpendicular to the plane of FIG. 12. Accordingly, the diffraction structure of the third emission diffraction element 24*c* has a configuration in which the pattern is arranged in an oblique direction (the arrangement direction of the pattern is the lower left direction) as indicated by S3C in FIG. 12.

In an image display apparatus including the light guide element shown in FIG. 12, images (light components corresponding to the images) displayed by the display element are diffracted to be incident into the light guide plate 16 by the first incidence diffraction element 18*a*, the second incidence diffraction element 18*b*, and the third incidence diffraction element 18*c* per predetermined wavelength range. The diffracted light by the first incidence diffraction element 18*a* is totally reflected and propagates in the light guide plate 16 such that the diffracted light is incident into the first emission diffraction element 24*a*. The light incident into the first emission diffraction element 24*a* is diffracted by the first emission diffraction element 24*a* to be emitted from the light guide plate 16. In addition, the diffracted light by the second incidence diffraction element 18*b* is totally reflected and propagates in the light guide plate 16 such that the diffracted light is incident into the second emission diffraction element 24*b*. The light incident into the second emission diffraction element 24*b* is diffracted by the second emission diffraction element 24*b* to be emitted from the light guide plate 16. In addition, the diffracted light by the third incidence diffraction element 18*c* is totally reflected and propagates in the light guide plate 16 such that the diffracted light is incident into the third emission diffraction element 24*c*. The light incident into the third emission diffraction element 24*c* is diffracted by the third emission diffraction element 24*c* to be emitted from the light guide plate 16.

The first emission diffraction element 24*a*, the second emission diffraction element 24*b*, and the third emission diffraction element 24*c* are disposed to overlap each other in the plane direction. Therefore, the light components diffracted and emitted by the first emission diffraction element 24*a*, the second emission diffraction element 24*b*, and the third emission diffraction element 24*c* are emitted from the light guide plate 16 at the same position and are provided for observation of the user U. As a result, three colors can be displayed.

In this configuration, the periodic direction of the diffraction structure of the third emission diffraction element 24*c* intersects with the periodic direction of the diffraction structure of the first emission diffraction element 24*a*. Therefore, the light having a wavelength that is diffracted by the first emission diffraction element 24*a* can be suppressed from being diffracted by the third emission diffraction element 24*c*. In addition, the light having a wavelength that is diffracted by the third emission diffraction element 24*c* can be suppressed from being diffracted by the first emission diffraction element 24*a*, and the occurrence of multiple images can be suppressed.

Even in this configuration, a direction from the second incidence diffraction element 18*b* to the emission diffraction element and a direction from the third incidence diffraction element 18*c* to the emission diffraction element substantially match each other. Therefore, the periodic direction of the diffraction structure of the third emission diffraction element 24*c* and the periodic direction of the diffraction structure of the second emission diffraction element 24*b* substantially match each other. Therefore, as described above, it is preferable that each of light components on a shorter wavelength side and on a longer wavelength side is diffracted by the second emission diffraction element 24*b* or the third emission diffraction element 24*c*. Alternatively, it is also preferable that each of the second emission diffraction element 24*b* and the third emission diffraction element 24*c* has wavelength selectivity.

[Diffraction Element]

As described above, it is preferable that each of the diffraction elements is any one of a surface relief type diffraction element, a volume hologram type diffraction element, or a polarization diffraction element. In addition, the diffraction element may be a transmission type diffraction element or a reflective type diffraction element.

Hereinafter, the configuration of each of the diffraction elements will be described.

[Surface Relief Type Diffraction Element]

As the surface relief type diffraction element, a well-known surface relief type diffraction element can be used. As in D1 shown in FIG. 13 as an example, the surface relief type diffraction element is configured such that linear fine unevenness is arranged on the surface in parallel at predetermined periods. The period of the diffraction structure, the material thereof, the height of the convex portion, and the like may be appropriately set depending on the wavelength range where light is diffracted.

In addition, in the surface relief type diffraction element, the diffraction structure (uneven structure) may be formed on the surface of a film-like material formed of a resin, or the diffraction structure (uneven structure) may be formed directly on the surface of the light guide plate.

Figure 13:
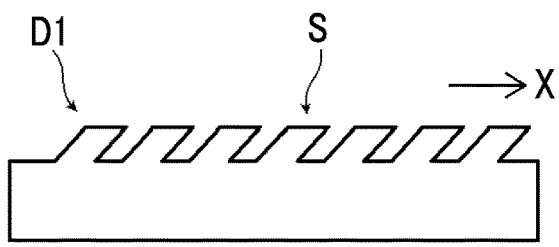
FIG. 13 is a cross-sectional view conceptually showing a surface relief type diffraction element.

In the surface relief type diffraction element, the uneven structure formed on the surface is the diffraction structure, the period of the uneven structure is the period of the diffraction structure, and the arrangement direction of the uneven structure indicated by arrow X in FIG. 13 is the periodic direction of the diffraction structure.

[Volume Hologram Type Diffraction Element]

As the volume hologram type diffraction element, a well-known volume hologram type diffraction element can be used. As in D2 shown in FIG. 14 as an example, the volume hologram type diffraction element is configured such that a linear region 110 having a high refractive index and a linear region 112 having a low refractive index are alternately arranged in parallel at predetermined periods. The period of the diffraction structure, the material thereof, the refractive index of each of the regions, and the like may be appropriately set depending on the wavelength range where light is diffracted.

Figure 14:
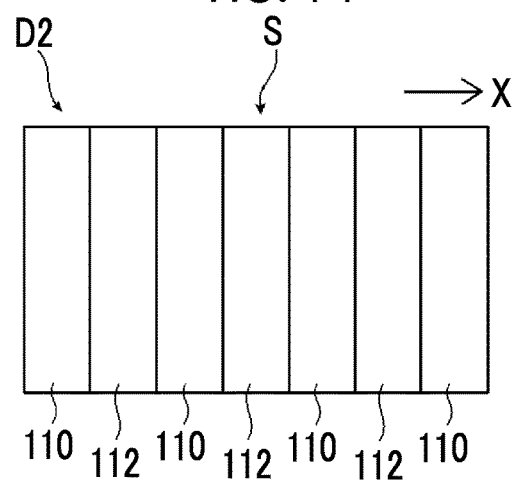
FIG. 14 is a front view conceptually showing a volume hologram type diffraction element.

In the volume hologram type diffraction element, the structure in which the linear region 110 having a high refractive index and the linear region 112 having a low refractive index are alternately formed is the diffraction structure, the period of the arrangement of the region 110 and the region 112 is the period of the diffraction structure, and the arrangement direction of the region 110 and the region 112 indicated by arrow X in FIG. 14 is the periodic direction of the diffraction structure.

[Polarization Diffraction Element]

As the polarization diffraction element, a well-known polarization diffraction element can be used. The polarization diffraction element is a diffraction element that controls a diffraction direction or a polarization state of emitted light and a diffracted light intensity depending on the polarization state of incident light by controlling the polarization state in a fine region. Examples of the polarization diffraction element include a polarization diffraction element in which a diffraction structure is formed using structural birefringence described in Erez Hasman et al., Polarization dependent focusing lens by use of quantized Pancharatnm-Berry phase diffractive optics, Applied Physics Letters, Volume 82, Number 3, pp. 328-330 and a polarization diffraction element in which a diffraction structure is formed using a birefringence material described in JP5276847B.

Examples of the polarization diffraction element include a liquid crystal diffraction element in which the liquid crystal diffraction element includes an optically-anisotropic layer that is formed using a composition including a liquid crystal compound and has a liquid crystal alignment pattern in which a direction of an optical axis derived from the liquid crystal compound changes while continuously rotating in at least one in-plane direction.

(Liquid Crystal Diffraction Element A)

An example of the liquid crystal diffraction element will be described using FIGS. 15 and 16.

Figure 15:
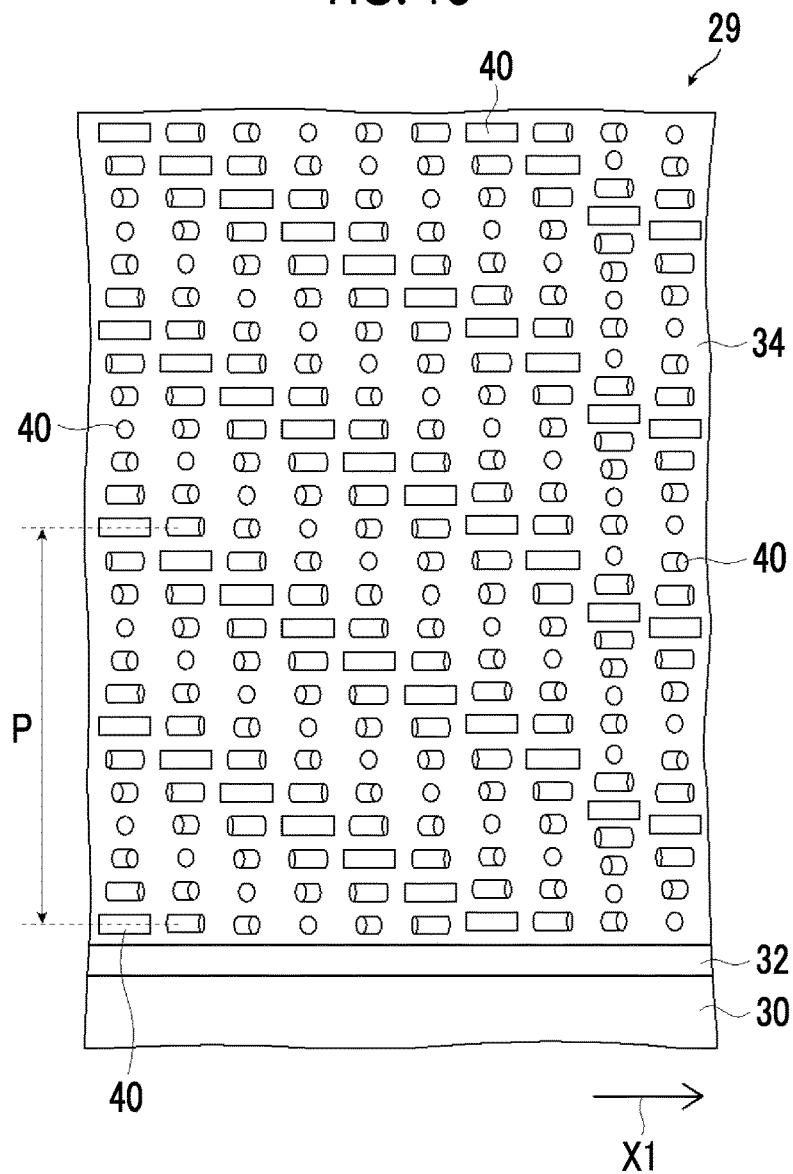
FIG. 15 is a conceptual diagram showing a liquid crystal diffraction element.
Figure 16:
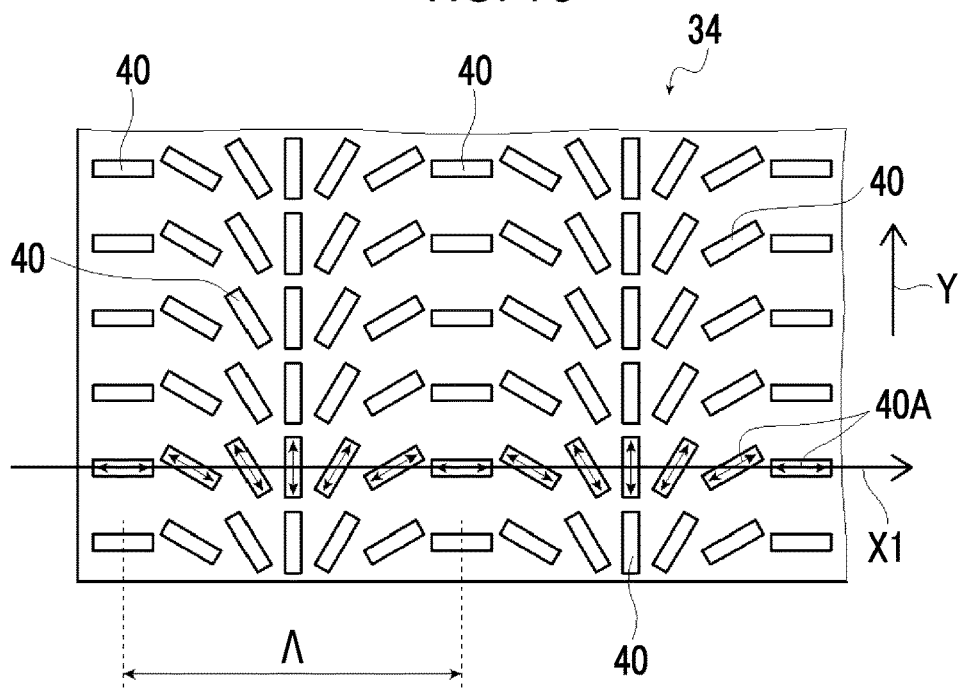
FIG. 16 is a plan view showing the liquid crystal diffraction element shown in FIG. 15.

A liquid crystal diffraction element 29 shown in FIGS. 15 and 16 is a patterned cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

In the example shown in FIG. 15, the liquid crystal diffraction element 29 includes a support 30, an alignment film 32, and a patterned cholesteric liquid crystal layer 34.

In the example shown in FIG. 15, the liquid crystal diffraction element 29 includes the support 30, the alignment film 32, and the patterned cholesteric liquid crystal layer 34. However, the present invention is not limited to this configuration. The liquid crystal diffraction element may include only the alignment film 32 and the patterned cholesteric liquid crystal layer 34 by peeling off the support 30 after bonding the laminate to the light guide plate 16. Alternatively, the liquid crystal diffraction element may include only the patterned cholesteric liquid crystal layer 34 by peeling off the support 30 and the alignment film 32 after bonding the laminate to the light guide plate 16.

<Support>

The support 30 supports the alignment film 32 and the patterned cholesteric liquid crystal layer 34.

As the support 30, various sheet-shaped materials (films or plate-shaped materials) can be used as long as they can support the alignment film 32 and the patterned cholesteric liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the patterned cholesteric liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

≤Alignment Film>

In the liquid crystal diffraction element 29, the alignment film 32 is formed on a surface of the support 30.

The alignment film 32 is an alignment film for aligning a liquid crystal compound 40 to a predetermined liquid crystal alignment pattern during the formation of the patterned cholesteric liquid crystal layer 34.

Although described below, in the present invention, the patterned cholesteric liquid crystal layer 34 has a liquid crystal alignment pattern in which a direction of an optical axis 40A (refer to FIG. 16) derived from the liquid crystal compound 40 changes while continuously rotating in one in-plane direction. Accordingly, the alignment film 32 is formed such that the patterned cholesteric liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the liquid crystal diffraction element 29, for example, the alignment film 32 can be suitably used as a so-called photo-alignment film obtained by irradiating a photo-alignable material with polarized light or non-polarized light. That is, in the liquid crystal diffraction element 29, a photo-alignment film that is formed by applying a photo-alignable material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 22:
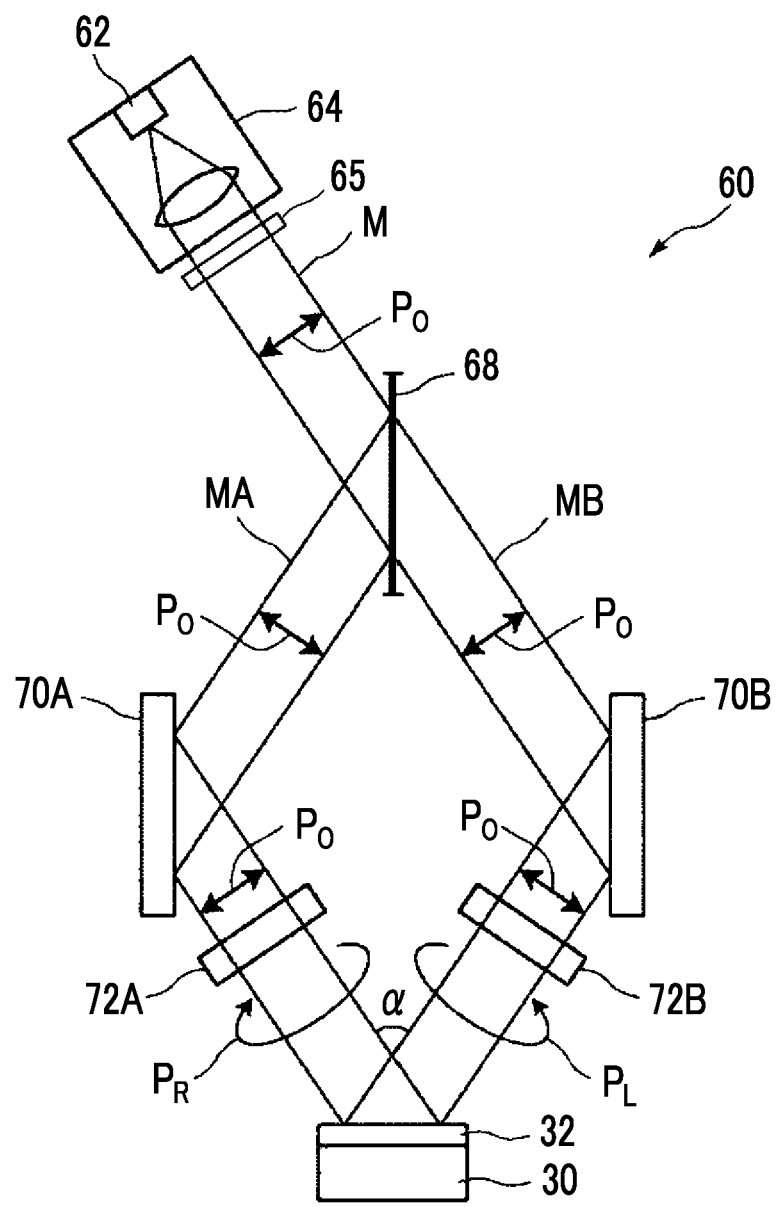
FIG. 22 is a conceptual diagram showing one example of an exposure device that exposes an alignment film of the liquid crystal diffraction element shown in FIG. 15.

FIG. 22 conceptually shows an example of an exposure device that exposes the alignment film 32 to form an alignment pattern.

An exposure device 60 shown in FIG. 22 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light Po. The λ/4 plate 72A converts the linearly polarized light Po (beam MA) into right circularly polarized light $P_R$, and the λ/4 plate 72B converts the linearly polarized light Po (beam MB) into left circularly polarized light $P_L$.

The support 30 including the alignment film 32 on which the alignment pattern is not yet formed is disposed at an exposed portion, the two beams MA and MB intersect and interfere each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the patterned cholesteric liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern in which the liquid crystal compound is aligned such that the direction of the optical axis of the liquid crystal compound in the patterned cholesteric liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the patterned cholesteric liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<Patterned Cholesteric Liquid Crystal Layer>

In the liquid crystal diffraction element 29, the patterned cholesteric liquid crystal layer 34 is formed on a surface of the alignment film 32.

As described above, the patterned cholesteric liquid crystal layer is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 15, the patterned cholesteric liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength-selective reflectivity.

Although described below in detail, the selective reflection wavelength range of the cholesteric liquid crystal layer depends on the length (pitch P shown in FIG. 15) of one helical pitch described above in the thickness direction.

Accordingly, in the configuration where wavelength selectivity is imparted to the liquid crystal diffraction element to diffract light having a wavelength that varies depending on each of the diffraction elements, the selective reflection wavelength range of the cholesteric liquid crystal layer may be set by adjusting the helical pitch P of the patterned cholesteric liquid crystal layer according to each of the liquid crystal diffraction elements.

<<Cholesteric Liquid Crystalline Phase>>

It is known that the cholesteric liquid crystalline phase exhibits selective reflectivity at a specific wavelength.

A center wavelength of selective reflection (selective reflection center wavelength) 2 of a general cholesteric liquid crystalline phase depends on a helical pitch P in the cholesteric liquid crystalline phase and complies with a relationship of $\lambda = n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

As described above, the helical pitch P refers to one pitch (helical period) of the helical structure of the cholesteric liquid crystalline phase, in other words, one helical turn.

That is, the helical pitch refers to the length in a helical axis direction in which a director (in the case of a rod-shaped liquid crystal, a major axis direction) of the liquid crystal compound constituting the cholesteric liquid crystalline phase rotates by 360°.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$), (nm) of a selective reflection wavelength range (circularly polarized light reflection wavelength range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the diffraction element and may be, for example, 10 to 500 nm and is preferably 20 to 300 nm and more preferably 30 to 100 nm.

<<Method of Forming Patterned Cholesteric Liquid Crystal Layer>>

The patterned cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the patterned cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the patterned cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the patterned cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the patterned cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the patterned cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether.

Among these organic solvents, one kind may be used alone, or two or more kinds may be used in combination. Among these, a ketone is preferable in consideration of an environmental burden.

In a case where the patterned cholesteric liquid crystal layer is formed, it is preferable that the patterned cholesteric liquid crystal layer is formed by applying the liquid crystal composition to a surface where the patterned cholesteric liquid crystal layer is to be formed, aligning the liquid crystal compound to a state of a cholesteric liquid crystalline phase, and curing the liquid crystal compound.

That is, in a case where the patterned cholesteric liquid crystal layer is formed on the alignment film 32, it is preferable that the patterned cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the patterned cholesteric liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the patterned cholesteric liquid crystal layer is not particularly limited, and the thickness with which a required light reflectivity can be obtained may be appropriately set depending on the use of the liquid crystal diffraction element 29, the light reflectivity required for the patterned cholesteric liquid crystal layer, the material for forming the patterned cholesteric liquid crystal layer, and the like.

<<Liquid Crystal Alignment Pattern of Patterned Cholesteric Liquid Crystal Layer>>

As described above, in the liquid crystal diffraction element 29, the patterned cholesteric liquid crystal layer has the liquid crystal alignment pattern in which the direction of the optical axis 40A derived from the liquid crystal compound 40 forming the cholesteric liquid crystalline phase changes while continuously rotating in the one in-plane direction of the patterned cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-shaped liquid crystal compound, the optical axis 40A is along a rod-shaped major axis direction. In the following description, the optical axis 40A derived from the liquid crystal compound 40 will also be referred to as "the optical axis 40A of the liquid crystal compound 40" or "the optical axis 40A".

FIG. 16 is a plan view conceptually showing the patterned cholesteric liquid crystal layer 34.

The plan view is a view in a case where the liquid crystal diffraction element 29 is seen from the top in FIG. 16, that is, a view in a case where the liquid crystal diffraction element 29 is seen from a thickness direction (laminating direction of the respective layers (films)).

In addition, in FIG. 16, in order to clarify the configuration of the liquid crystal diffraction element 29 (patterned cholesteric liquid crystal layer 34), only the liquid crystal compound 40 on the surface of the alignment film 32 is shown.

As shown in FIG. 16, on the surface of the alignment film 32, the liquid crystal compound 40 forming the patterned cholesteric liquid crystal layer 34 has the liquid crystal alignment pattern in which the direction of the optical axis 40A changes while continuously rotating in the predetermined one in-plane direction indicated by arrow X1 in a plane of the liquid crystal diffraction element 29 according to the alignment pattern formed on the alignment film 32 as the lower layer. In the example shown in the drawing, the liquid crystal compound 40 has the liquid crystal alignment pattern in which the optical axis 40A of the liquid crystal compound 40 changes while continuously rotating clockwise in the arrow X1 direction.

The liquid crystal compound 40 forming the patterned cholesteric liquid crystal layer 34 is two-dimensionally arranged in a direction perpendicular to the arrow X1 and the one in-plane direction (arrow X1 direction).

In the following description, the direction perpendicular to the arrow X1 direction will be referred to as "Y direction" for convenience of description. That is, the arrow Y direction is a direction perpendicular to the one in-plane direction in which the direction of the optical axis 40A of the liquid crystal compound 40 changes while continuously rotating in a plane of the patterned cholesteric liquid crystal layer. Accordingly, in FIGS. 15 and 17 described below, the Y direction is a direction perpendicular to the paper plane.

Specifically, "the direction of the optical axis 40A of the liquid crystal compound 40 changes while continuously rotating in the arrow X1 direction (the predetermined one in-plane direction)" represents that an angle between the optical axis 40A of the liquid crystal compound 40, which is arranged in the arrow X1 direction, and the arrow X1 direction varies depending on positions in the arrow X1 direction, and the angle between the optical axis 40A and the arrow X1 direction sequentially changes from θ to θ+180° or θ-180° in the arrow X1 direction.

A difference between the angles of the optical axes 40A of the liquid crystal compound 40 adjacent to each other in the arrow X1 direction is preferably 450 or less, more preferably 15° or less, and still more preferably less than 15°.

On the other hand, in the liquid crystal compound 40 forming the patterned cholesteric liquid crystal layer 34, the directions of the optical axes 40A are the same in the Y direction perpendicular to the arrow X1 direction, that is, the Y direction perpendicular to the one in-plane direction in which the optical axis 40A continuously rotates.

In other words, in the liquid crystal compound 40 forming the patterned cholesteric liquid crystal layer 34, angles between the optical axes 40A of the liquid crystal compound 40 and the arrow X1 direction are the same in the Y direction.

In the patterned cholesteric liquid crystal layer 34, in the liquid crystal alignment pattern of the liquid crystal compound 40, the length (distance) over which the optical axis 40A of the liquid crystal compound 40 rotates by 180° in the arrow X1 direction in which the optical axis 40A changes while continuously rotating in a plane is the length A of the single period in the liquid crystal alignment pattern.

That is, a distance between centers of two liquid crystal compounds 40 in the arrow X1 direction is the length A of the single period, the two liquid crystal compounds having the same angle in the arrow X1 direction. Specifically, as shown in FIG. 16, a distance of centers in the arrow X1 direction of two liquid crystal compounds 40 in which the arrow X1 direction and the direction of the optical axis 40A match each other is the length A of the single period. In the following description, the length A of the single period will also be referred to as "single period ∧".

In the liquid crystal alignment pattern of the patterned cholesteric liquid crystal layer 34, the single period ∧ is repeated in the arrow X1 direction, that is, in the one in-plane direction in which the direction of the optical axis 40A changes while continuously rotating.

The patterned cholesteric liquid crystal layer obtained by immobilizing a cholesteric liquid crystalline phase typically reflects incident light (circularly polarized light) by specular reflection.

On the other hand, the patterned cholesteric liquid crystal layer 34 reflects incidence light in a state where it is tilted in the arrow X1 direction with respect to the specular reflection. The patterned cholesteric liquid crystal layer 34 has the liquid crystal alignment pattern in which the optical axis 40A changes while continuously rotating in the arrow X1 direction in a plane (the predetermined one in-plane direction). Hereinafter, the description will be made with reference to FIG. 17.

For example, the patterned cholesteric liquid crystal layer 34 selectively reflects right circularly polarized light $R_R$ of red light. Accordingly, in a case where light is incident into the patterned cholesteric liquid crystal layer 34, the patterned cholesteric liquid crystal layer 34 reflects only right circularly polarized light $R_R$ of red light and allows transmission of the other light.

In a case where the right circularly polarized light $R_R$ of red light incident into the patterned cholesteric liquid crystal layer 34 is reflected from the patterned cholesteric liquid crystal layer, the absolute phase changes depending on the directions of the optical axes 40A of the respective liquid crystal compounds 40.

Here, in the patterned cholesteric liquid crystal layer 34, the optical axis 40A of the liquid crystal compound 40 changes while rotating in the arrow X1 direction (the one in-plane direction). Therefore, the amount of change in the absolute phase of the incident right circularly polarized light $R_R$ of red light varies depending on the directions of the optical axes 40A.

Further, the liquid crystal alignment pattern formed in the patterned cholesteric liquid crystal layer 34 is a pattern that is periodic in the arrow X1 direction. Therefore, as conceptually shown in FIG. 17, an absolute phase Q that is periodic in the arrow X1 direction corresponding to the direction of the optical axis 40A is assigned to the right circularly polarized light $R_R$ of red light incident into the patterned cholesteric liquid crystal layer 34.

In addition, the direction of the optical axis 40A of the liquid crystal compound 40 with respect to the arrow X1 direction is uniform in the arrangement of the liquid crystal compound 40 in the Y direction perpendicular to arrow X1 direction.

As a result, in the patterned cholesteric liquid crystal layer 34, an equiphase surface E that is tilted in the arrow X1 direction with respect to an XY plane is formed for the right circularly polarized light $R_R$ of red light.

Therefore, the right circularly polarized light $R_R$ of red light is reflected in the normal direction of the equiphase surface E, and the reflected right circularly polarized light $R_R$ of red light is reflected in a direction that is tilted in the arrow X1 direction with respect to the XY plane (main surface of the cholesteric liquid crystal layer).

Accordingly, by appropriately setting the arrow X1 direction as the one in-plane direction in which the optical axis 40A rotates, a direction in which the right circularly polarized light $R_R$ of red light is reflected can be adjusted.

Figure 17:
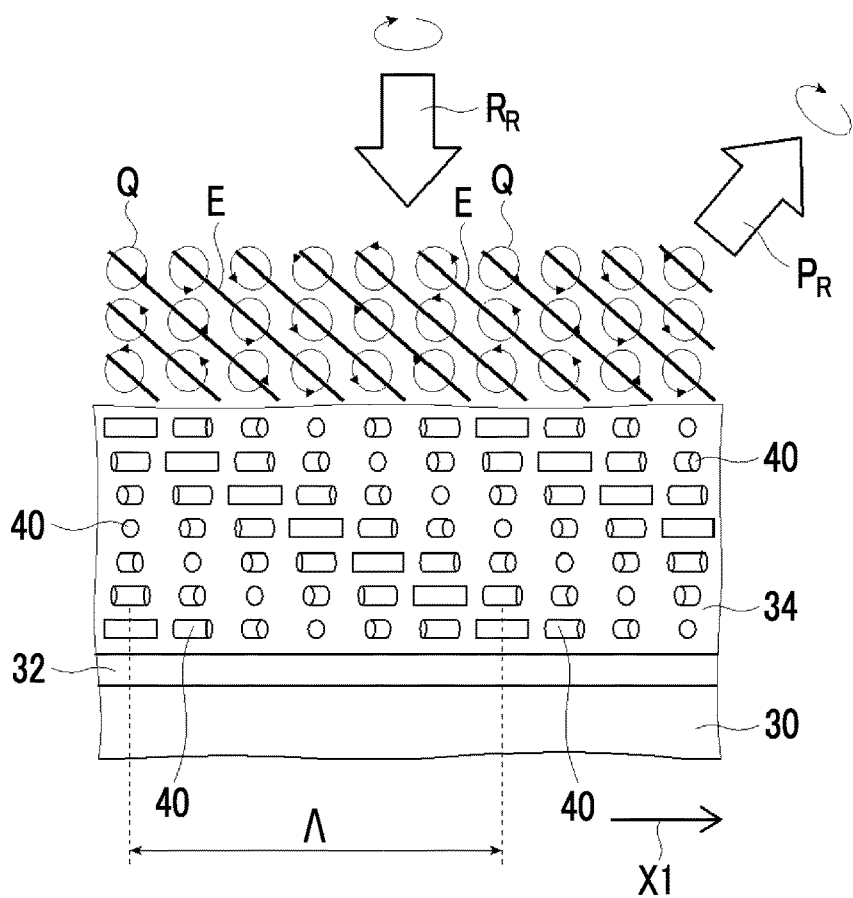
FIG. 17 is a conceptual diagram showing an action of the liquid crystal diffraction element shown in FIG. 15.

That is, by reversing the arrow X1 direction, the reflection direction of the right circularly polarized light $R_R$ of red light is opposite to that of FIGS. 16 and 17.

In addition, by reversing the rotation direction of the optical axis 40A of the liquid crystal compound 40 toward the arrow X1 direction, a reflection direction of the right circularly polarized light $R_R$ of red light can be reversed.

That is, in FIGS. 16 and 17, the rotation direction of the optical axis 40A toward the arrow X1 direction is clockwise, and the right circularly polarized light $R_R$ of red light is reflected in a state where it is tilted in the arrow X1 direction. By setting the rotation direction of the optical axis 40A to be counterclockwise, the right circularly polarized light $R_R$ of red light is reflected in a state where it is tilted in a direction opposite to the arrow X1 direction.

Further, in the patterned cholesteric liquid crystal layer having the same liquid crystal alignment pattern, the reflection direction is reversed by adjusting the helical turning direction of the liquid crystal compound 40, that is, the turning direction of circularly polarized light to be reflected.

The patterned cholesteric liquid crystal layer 34 shown in FIG. 17 has a right-twisted helical turning direction, selectively reflects right circularly polarized light, and has the liquid crystal alignment pattern in which the optical axis 40A rotates clockwise in the arrow X1 direction. As a result, the right circularly polarized light is reflected in a state where it is tilted in the arrow X1 direction.

Accordingly, in the patterned cholesteric liquid crystal layer that has a left-twisted helical turning direction, selectively reflects left circularly polarized light, and has the liquid crystal alignment pattern in which the optical axis 40A rotates clockwise in the arrow X1 direction, the left circularly polarized light is reflected in a state where it is tilted in a direction opposite to the arrow X1 direction.

In the liquid crystal diffraction element, the liquid crystal alignment pattern of the liquid crystal compound in which the optical axis of the liquid crystal compound changes while rotating in the one in-plane direction is the diffraction structure, the length over which the optical axis of the liquid crystal compound rotates by 180° in the liquid crystal alignment pattern of the liquid crystal compound is the period of the diffraction structure, and the one in-plane direction in which the optical axis of the liquid crystal compound changes while rotating is the periodic direction of the diffraction structure.

In the patterned cholesteric liquid crystal layer having the liquid crystal alignment pattern, as the single period $\Lambda$ decreases, the angle of reflected light with respect to the above-described incidence light increases. That is, as the single period $\Lambda$ decreases, reflected light can be reflected in a state where it is largely tilted with respect to incidence light.

(Liquid Crystal Diffraction Element B)

In the above-described example, the patterned cholesteric liquid crystal layer is used as the liquid crystal diffraction element. Various liquid crystal diffraction elements can be used as the liquid crystal diffraction element used in the present invention as long as they have the liquid crystal alignment pattern in which the optical axis 40A derived from the liquid crystal compound 40 continuously rotates in at least one in-plane direction.

In the present invention, a liquid crystal diffraction element that has the liquid crystal alignment pattern where the optical axis continuously rotates in at least one in-plane direction and in which the liquid crystal compound does not form a cholesteric liquid crystalline phase in the thickness direction and rotates can also be used. The liquid crystal diffraction element may have a configuration in which the liquid crystal compound is helically twisted and rotates in the thickness direction to some extent that a cholesteric liquid crystalline phase is not formed.

Figure 18:
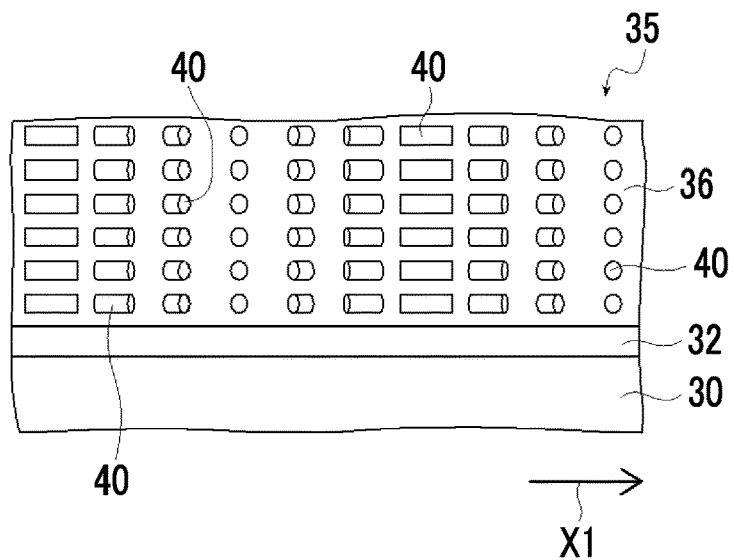
FIG. 18 is a diagram conceptually showing another example of the liquid crystal diffraction element.
Figure 19:
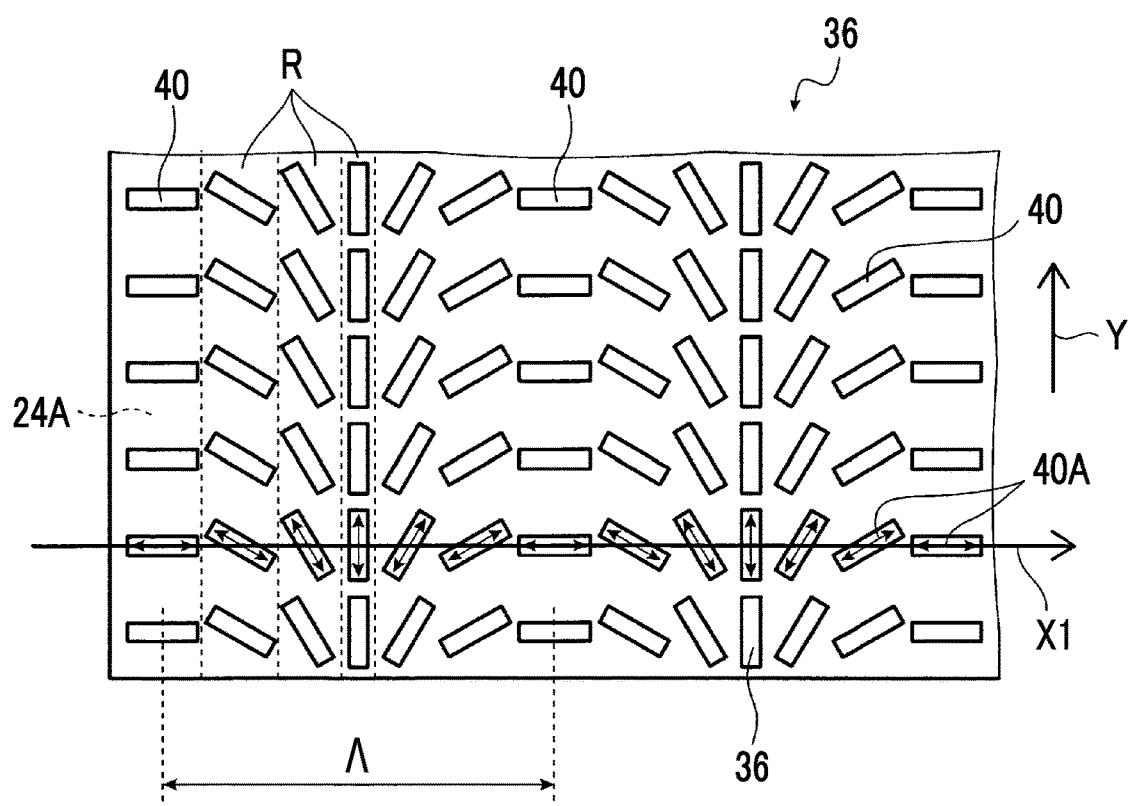
FIG. 19 is a plan view showing the liquid crystal diffraction element shown in FIG. 18.

FIGS. 18 and 19 show an example of another liquid crystal diffraction element.

A liquid crystal diffraction element 35 shown in FIGS. 18 and 19 includes the support 30, the alignment film 32, and a patterned liquid crystal layer 36.

As shown in FIG. 19, as in the patterned cholesteric liquid crystal layer 34, the patterned liquid crystal layer 36 of the liquid crystal diffraction element 35 also has the liquid crystal alignment pattern in which the optical axis 40A of the liquid crystal compound 40 continuously rotates in the arrow X1 direction. FIG. 19 also shows only the liquid crystal compound of the surface of the alignment film 32 as in FIG. 16.

In the liquid crystal diffraction element 35, the liquid crystal compound 40 forming the patterned liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the patterned cholesteric liquid crystal layer.

As described above, the patterned liquid crystal layer 36 has the liquid crystal alignment pattern in which the direction of the optical axis 40A derived from the liquid crystal compound 40 changes while continuously rotating in the arrow X direction in a plane, that is, in the one in-plane direction indicated by arrow X.

On the other hand, regarding the liquid crystal compound 40 forming the patterned liquid crystal layer 36, the liquid crystal compounds 40 having the same direction of the optical axes 40A are arranged at regular intervals in the Y direction perpendicular to the arrow X1 direction, that is, the Y direction perpendicular to the one in-plane direction in which the optical axis 40A continuously rotates.

In other words, regarding the liquid crystal compound 40 forming the patterned liquid crystal layer 36, in the liquid crystal compounds 40 arranged in the Y direction, angles between the directions of the optical axes 40A and the arrow X1 direction are the same.

In the liquid crystal compounds arranged in the Y direction in the patterned liquid crystal layer 36, the angles between the optical axes 40A and the arrow X direction (the one in-plane direction in which the direction of the optical axis of the liquid crystal compound 40 rotates) are the same. Regions where the liquid crystal compounds 40 in which the angles between the optical axes 40A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In a case where circularly polarized light is incident into the above-described patterned liquid crystal layer 36, the light is refracted such that the direction of the circularly polarized light is converted.

Figure 20:
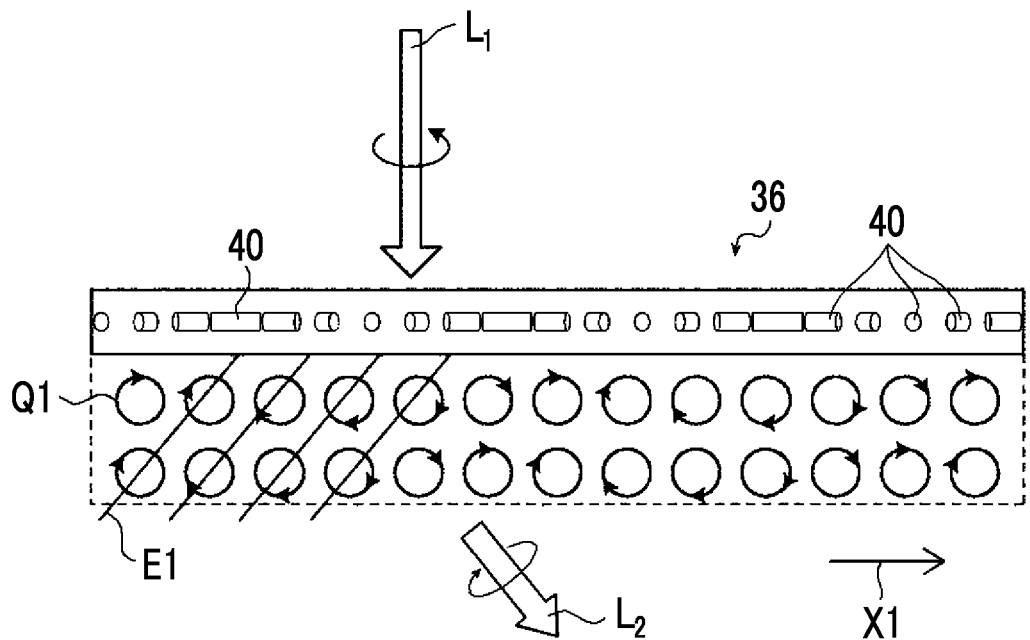
FIG. 20 is a conceptual diagram showing an action of the liquid crystal diffraction element shown in FIG. 18.
Figure 21:
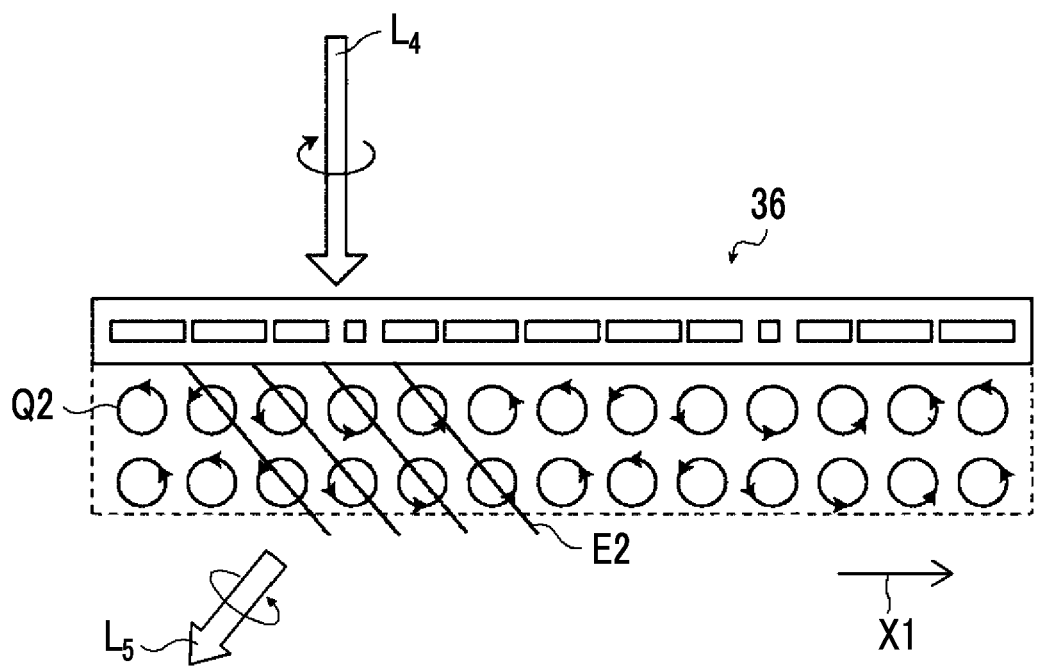
FIG. 21 is a conceptual diagram showing an action of the liquid crystal diffraction element shown in FIG. 18.

This action is conceptually shown in FIGS. 20 and 21. In the patterned liquid crystal layer 36, the value of the product of the difference in refractive index of the liquid crystal compound and the thickness of the optically-anisotropic layer is λ/2.

As shown in FIG. 20, in a case where the value of the product of the difference in refractive index of the liquid crystal compound in the patterned liquid crystal layer 36 and the thickness of the optically-anisotropic layer is λ/2 and incidence light $L_1$ as left circularly polarized light is incident into the patterned liquid crystal layer 36, the incidence light $L_1$ transmits through the patterned liquid crystal layer 36 to be imparted with a phase difference of 180°, and the transmitted light $L_2$ is converted into right circularly polarized light.

In addition, in a case where the incidence light $L_1$ transmits through the patterned liquid crystal layer 36, an absolute phase thereof changes depending on the direction of the optical axis 40A of each of the liquid crystal compounds 40. In this case, the direction of the optical axis 40A changes while rotating in the arrow X direction. Therefore, the amount of change in the absolute phase of the incidence light $L_1$ varies depending on the direction of the optical axis 40A. Further, the liquid crystal alignment pattern that is formed in the patterned liquid crystal layer 36 is a pattern that is periodic in the arrow X direction. Therefore, as shown in FIG. 20, the incidence light $L_1$ transmitted through the patterned liquid crystal layer 36 is imparted with an absolute phase Q1 that is periodic in the arrow X direction corresponding to the direction of each of the optical axes 40A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as shown in FIG. 21, in a case where the value of the product of the difference in refractive index of the liquid crystal compound in the patterned liquid crystal layer 36 and the thickness of the optically-anisotropic layer is λ/2 and incidence light $L_4$ of right circularly polarized light is incident into the patterned liquid crystal layer 36, the incidence light $L_4$ transmits through the patterned liquid crystal layer 36 to be imparted with a phase difference of 180°, and the transmitted light $L_4$ is converted into transmitted light $L_5$ of left circularly polarized light.

In addition, in a case where the incidence light $L_4$ transmits through the patterned liquid crystal layer 36, an absolute phase thereof changes depending on the direction of the optical axis 40A of each of the liquid crystal compounds 40. In this case, the direction of the optical axis 40A changes while rotating in the arrow X direction. Therefore, the amount of change in the absolute phase of the incidence light $L_4$ varies depending on the direction of the optical axis 40A. Further, the liquid crystal alignment pattern that is formed in the patterned liquid crystal layer 36 is a pattern that is periodic in the arrow X direction. Therefore, as shown in FIG. 21, the incidence light $L_4$ transmitted through the patterned liquid crystal layer 36 is imparted with an absolute phase Q2 that is periodic in the arrow X direction corresponding to the direction of each of the optical axes 40A.

Here, the incidence light $L_4$ is right circularly polarized light. Therefore, the absolute phase Q2 that is periodic in the arrow X direction corresponding to the direction of the optical axis 40A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

As in the patterned cholesteric liquid crystal layer 34, by changing the single period $\wedge$ of the liquid crystal alignment pattern formed in the patterned liquid crystal layer 36, refraction angles of the transmitted light components $L_2$ and $L_5$ can be adjusted. Specifically, even in the patterned liquid crystal layer 36, as the single period $\wedge$ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrow X1 direction, the refraction direction of transmitted light can be reversed. That is, in the example FIGS. 18 to 21, the rotation direction of the optical axis 40A toward the arrow X direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°).

Here, each of the patterned cholesteric liquid crystal layer 34 shown in FIG. 15 the patterned liquid crystal layer 36 shown in FIG. 18 has a configuration in which the optical axis of the liquid crystal compound is parallel to the main surface of the liquid crystal layer (liquid crystal diffraction element), but the present invention is not limited thereto.

Figure 24:
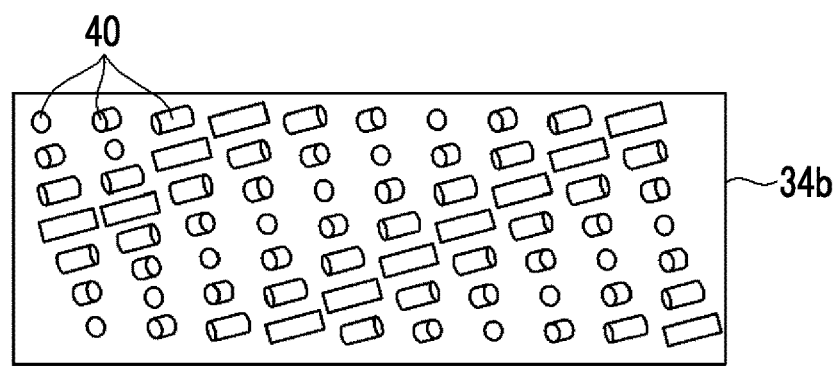
FIG. 24 is a conceptual diagram showing another example of the liquid crystal diffraction element.
Figure 25:
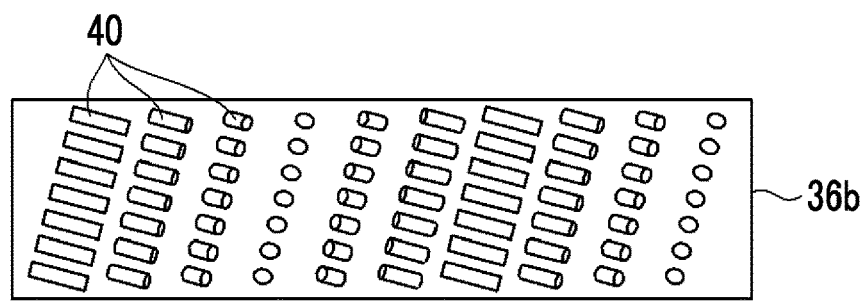
FIG. 25 is a conceptual diagram showing still another example of the liquid crystal diffraction element.

For example, as in the patterned cholesteric liquid crystal layer 34b shown in FIG. 24, in the above-described patterned cholesteric liquid crystal layer, the optical axis of the liquid crystal compound may be tilted with respect to the main surface of the liquid crystal layer (liquid crystal diffraction element). In addition, as in a patterned liquid crystal layer 36b shown in FIG. 25, in the above-described patterned liquid crystal layer, the optical axis of the liquid crystal compound may be tilted with respect to the main surface of the liquid crystal layer (liquid crystal diffraction element). These liquid crystal layers are the same as the patterned cholesteric liquid crystal layer 34 and the patterned liquid crystal layer 36 in that they have the liquid crystal alignment pattern in which the direction of the optical axis derived from the liquid crystal compound changes while continuously rotating in the one in-plane direction. That is, a plan view of the patterned cholesteric liquid crystal layer 34b and a plan view of the patterned liquid crystal layer 36b are the same as that of FIG. 16.

In the following description, the configuration in which the optical axis of the liquid crystal compound is tilted with respect to the main surface of the liquid crystal layer (liquid crystal diffraction element) also has a pretilt angle.

The liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

In a case where the liquid crystal layer has the pretilt angle on the surface, the liquid crystal layer further has a tilt angle due to the influence of the surface even in a bulk portion distant from the surface. The liquid crystal compound has the pretilt angle (is tilted). As a result, in a case where light is diffracted, the effective birefringence index of the liquid crystal compound increases, and the diffraction efficiency can be improved.

The pretilt angle can be measured by cutting the liquid crystal layer with a microtome and observing a cross-section with a polarizing microscope.

In the present invention, light that is vertically incident into the liquid crystal diffraction element (liquid crystal layer) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the pretilt angle according to the desired diffraction orientation, a deviation from the original diffraction conditions in the orientation can be suppressed. As a result, it is presumed that, in a case where the liquid crystal compound having a pretilt angle is used, a higher diffraction efficiency can be obtained.

In addition, it is desirable that the pretilt angle is controlled by treating the interface of the liquid crystal layer. By pretilting the alignment film on the support side interface, the pretilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the patterned cholesteric liquid crystal layer observed with a scanning electron microscope (SEM), bright portions and dark portions derived from a cholesteric liquid crystalline phase are tilted with respect to a main surface. Further, in a case where an in-plane retardation Re of the patterned cholesteric liquid crystal layer is measured from a direction tilted with respect to a normal direction and a normal line, it is preferable that an absolute value of a measured angle of a direction in which the in-plane retardation Re is minimum in any one of a slow axis plane or a fast axis plane with respect to the normal line is 5° or more. In other words, it is preferable that the liquid crystal compound of the patterned cholesteric liquid crystal layer is tilted with respect to the main surface and the tilt direction substantially matches with the bright lines and the dark lines of the cholesteric liquid crystalline phase. The normal direction is a direction perpendicular to the main surface.

By the patterned cholesteric liquid crystal layer having the above-described configuration, circularly polarized light can be diffracted with a higher diffraction efficiency than the patterned cholesteric liquid crystal layer in which the liquid crystal compound is parallel to the main surface as shown in FIG. 15.

In the configuration where the liquid crystal compound of the patterned cholesteric liquid crystal layer is tilted with respect to the main surface and the tilt direction substantially matches with the bright lines and the dark lines of the cholesteric liquid crystalline phase, bright portions and dark portions corresponding to a reflecting surface match with the optical axis of the liquid crystal compound. Therefore, the action of the liquid crystal compound on light reflection (diffraction) increases, the diffraction efficiency can be improved. As a result, the amount of reflected light with respect to incidence light can be further improved.

In a fast axis plane or a slow axis plane of the patterned cholesteric liquid crystal layer, the absolute value of the optical axis tilt angle of the patterned cholesteric liquid crystal layer is 5° or more, preferably 15° or more, and more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

In the light guide element according to the embodiment of the present invention, any one of a surface relief type diffraction element, a volume hologram type diffraction element, or a polarization diffraction element may be used each of the diffraction elements. In addition, different kinds of diffraction elements may be used in combination. For example, a surface relief type diffraction element may be used as the incidence diffraction element, and a polarization diffraction element (liquid crystal diffraction element) may be used as the intermediate diffraction element and the emission diffraction element. Different kinds of diffraction elements may also be used as the first incidence diffraction element and the second incidence diffraction element. Likewise, different kinds of diffraction elements may be used as the first intermediate diffraction element, the second intermediate diffraction element, the first emission diffraction element, and the second emission diffraction element.

In order to improve visibility for the light guide element and the image display apparatus according to the embodiment of the present invention, a diffractive optical method of enlarging an exit pupil may be used.

Specifically, a diffractive optical method of using a plurality of diffraction components (diffraction elements), that is, an optical method of using in-coupling, intermediate and out-coupling diffractive element can be used. This method is described in detail in JP2008-546020A.

Hereinabove, the light guide element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

Preparation of Incidence Diffraction Element G

Formation of Alignment Film

A glass substrate was used as the support. The following alignment film-forming coating solution was applied to the support by spin coating. The support on which the coating film of the alignment film-forming coating solution was formed was dried using a hot plate at 60° C. for 60 seconds. As a result, an alignment film was formed.

Alignment Film-Forming Coating Solution

| The following material for photo-alignment | 1.00 part by mass |
| Water | 16.00 parts by mass |
| Butoxyethanol | 42.00 parts by mass |
| Propylene glycol monomethyl ether | 42.00 parts by mass |

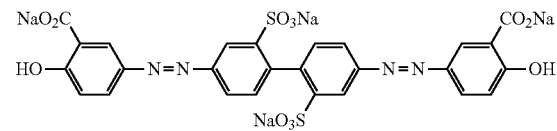

(Exposure of Alignment Film)

The alignment film was exposed using the exposure device shown in FIG. 22 to form an alignment film P-1 having an alignment pattern.

In the exposure device, a laser that emits laser light having a wavelength (325 nm) was used as the laser. The exposure dose of the interference light was 1000 mJ/cm$^2$. The single period (the length over which the optical axis rotates by 180°) of an alignment pattern formed by interference of two laser beams was controlled by changing an intersecting angle (intersecting angle α) between the two beams.

(Formation of Patterned Cholesteric Liquid Crystal Layer)

As the liquid crystal composition forming the first incidence diffraction element, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.87 parts by mass |
| Methyl ethyl ketone | 204.00 parts by mass |

Rod-Shaped Liquid Crystal Compound L-1

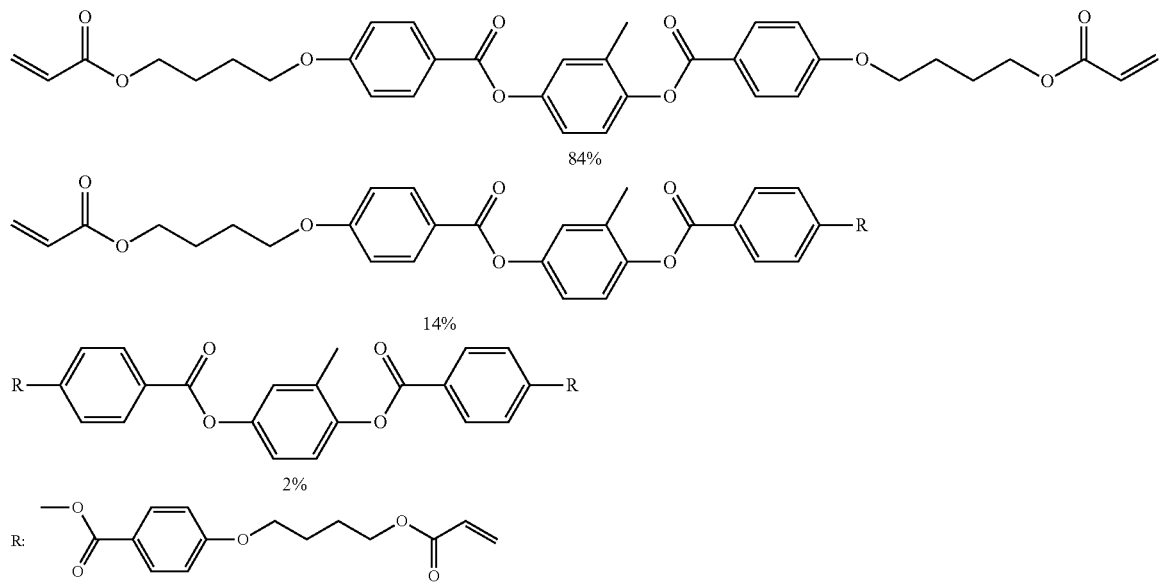

Chiral Agent Ch-1

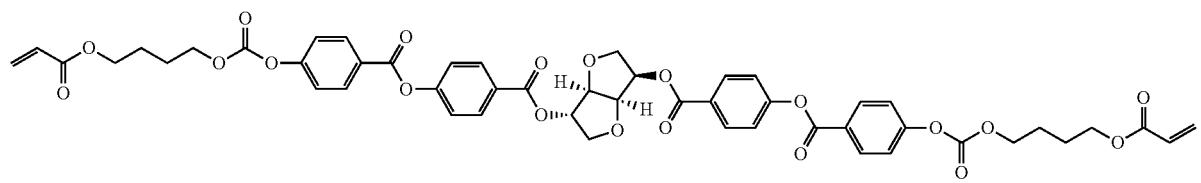 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

The above-described composition A-1 was applied to the alignment film P-1 to form a coating film, the coating film was heated using a hot plate at 80° C. and was irradiated at 80° C. with ultraviolet light having a wavelength of 365 nm at an irradiation dose of 300 mJ/cm$^2$ using a high-pressure mercury lamp in a nitrogen atmosphere. As a result, the alignment of the liquid crystal compound is immobilized, and the patterned cholesteric liquid crystal layer (first layer) of the first incidence diffraction element was formed.

In a case where a cross-section of a coating layer was observed with a scanning electron microscope (SEM), the thickness surface pitch of the normal direction (thickness direction) with respect to the main surface was 8 pitches. Regarding the thickness surface pitch, an interval between bright portions or between dark portions in the normal direction with respect to the main surface was set as an ½ surface pitch. In addition, the slope pitch of tilted surfaces of bright portions and dark portions with respect to a main surface was 0.39 μm. Regarding the slope pitch, an interval between bright portions or between dark portions in the normal direction with respect to the slope was set as an ½ surface pitch. The bright portions and the dark portions described herein refer to bright portions and dark portions derived from a cholesteric liquid crystalline phase in a case where a cross-section of the cholesteric liquid crystal layer was observed with a SEM.

It was verified using a polarizing microscope that the patterned cholesteric liquid crystal layer of the incidence diffraction element G had a periodically aligned surface as shown in FIG. 16. In a case where a cross-section of the coating layer was observed with a SEM, in the liquid crystal alignment pattern of the patterned cholesteric liquid crystal layer (first layer) of the incidence diffraction element G, the single period over which the optical axis of the liquid crystal compound rotated by 180° was 0.43 µm.

A patterned cholesteric liquid crystal layer (second layer) was formed on the patterned cholesteric liquid crystal layer (first layer) using the same method as that of Example 1-1, except that the amount of the chiral agent Ch-1 in the composition A-1 was changed to 4.31 parts by mass and the thickness adjusted.

In a case where the patterned cholesteric liquid crystal layer (second layer) was cut in a direction along the rotation direction of the optical axis and a cross-section was observed with a SEM, the thickness surface pitch was 8 pitches, and the slope pitch was 0.44 µm. In the liquid crystal alignment pattern of the patterned cholesteric liquid crystal layer (second layer) of the incidence diffraction element G, the single period over which the optical axis of the liquid crystal compound rotated by 180° was 0.43 µm.

Preparation of Incidence Diffraction Element R

An incidence diffraction element R was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.12 parts by mass, the amount of the chiral agent in the composition for forming the patterned cholesteric liquid crystal layer (second layer) was changed to 3.52 parts by mass, and the thickness was adjusted.

In the patterned cholesteric liquid crystal layer (first layer) and the patterned cholesteric liquid crystal layer (second layer) of the incidence diffraction element R, the thickness surface pitch was 8 pitches. In the liquid crystal alignment pattern, the single period over which the optical axis of the liquid crystal compound rotated by 180° was 0.51 m. The slope pitch of the patterned cholesteric liquid crystal layer (first layer) was 0.46 µm, and the slope pitch of the patterned cholesteric liquid crystal layer (second layer) was 0.53 µm.

Preparation of Intermediate Diffraction Element G

An intermediate diffraction element G was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.75 parts by mass, and the thickness was adjusted. The second patterned cholesteric liquid crystal layer was not formed.

In the patterned cholesteric liquid crystal layer (first layer) of the intermediate diffraction element G, the thickness surface pitch was 2 pitches, and in the liquid crystal alignment pattern, the single period over which the optical axis derived from the liquid crystal compound rotated by 180° was 0.23 µm. The slope pitch of the patterned cholesteric liquid crystal layer (first layer) was 0.40 µm.

Preparation of Intermediate Diffraction Element R

An intermediate diffraction element R was prepared using the same method as that of the incidence diffraction element R, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.42 parts by mass, and the thickness was adjusted. The second patterned cholesteric liquid crystal layer was not formed.

In the patterned cholesteric liquid crystal layer (first layer) of the intermediate diffraction element R, the thickness surface pitch was 2 pitches, and in the liquid crystal alignment pattern, the single period over which the optical axis derived from the liquid crystal compound rotated by 180° was 0.28 µm. The slope pitch of the patterned cholesteric liquid crystal layer (first layer) was 0.43 µm.

Preparation of Emission Diffraction Element

An emission diffraction element G and an emission diffraction element R were prepared using the same methods as those of the incidence diffraction element G and the incidence diffraction element R, except that the thickness was adjusted.

In each of the patterned cholesteric liquid crystal layer (first layer) and the patterned cholesteric liquid crystal layer (second layer), the thickness surface pitch was 2 pitches.

Preparation of Light Guide Element

As the light guide plate, a glass (material) light guide plate formed of glass and having a size of 60 mm×70 mm and a thickness of 1 mm was used. The incidence diffraction element G was used as the first incidence diffraction element, the incidence diffraction element R was used as the second incidence diffraction element, the intermediate diffraction element G was used as the first intermediate diffraction element, the intermediate diffraction element R was used as the second intermediate diffraction element, the emission diffraction element G was used as the first emission diffraction element, and the emission diffraction element R was used as the second emission diffraction element.

The incidence diffraction element was cut into a size having a diameter of 6 mm and used. The intermediate diffraction element was cut into a size of 15 mm (maximum)×25 mm and used. The emission diffraction element was cut into a size of 20 mm×25 mm and used.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

Each of the prepared diffraction elements was bonded to one main surface of the light guide plate using am adhesive.

Each of the diffraction elements was disposed as shown in FIG. 1. That is, the first incidence diffraction element and the second incidence diffraction element were laminated and disposed. In addition, the first emission diffraction element and the second emission diffraction element were laminated and disposed.

The intermediate diffraction element and the incidence diffraction element were disposed to be spaced from each other by 1 mm in the left-right direction. In addition, the emission diffraction elements and the incidence diffraction elements were disposed to be spaced from each other by 8 mm in the up-down direction.

The emission diffraction element and the incidence diffraction element were disposed on different main surfaces of the light guide plate.

As a result, a light guide element was prepared. In the light guide element, an angle between the periodic direction of the diffraction structure of the first emission diffraction element and the periodic direction of the diffraction structure of the second emission diffraction element was 90°.

In addition, in subsequent Examples and Comparative Examples, the disposition of the diffraction elements was appropriately adjusted.

Example 2

A light guide element was prepared using the same method as that of Example 1, except that the first incidence diffraction element and the second incidence diffraction element were disposed to be spaced from each other in the plane direction as shown in FIG. 6.

Comparative Example 1

A light guide element was prepared using the same method as that of Example 1, except that the second intermediate diffraction element was laminated and disposed on the first intermediate diffraction element, the diffraction direction of the first incidence diffraction element is opposite in the left-right direction, and the periodic direction of the diffraction structure of the second emission diffraction element rotated by 90°. That is, an angle between the periodic direction of the diffraction structure of the first emission diffraction element and the periodic direction of the diffraction structure of the second emission diffraction element was 0°.

Examples 3 and 4 and Comparative Example 2

Preparation of Incidence Diffraction Element B

An incidence diffraction element B was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 5.73 parts by mass, the amount of the chiral agent in the composition for forming the patterned cholesteric liquid crystal layer (second layer) was changed to 5.00 parts by mass, and the thickness was adjusted.

In the patterned cholesteric liquid crystal layer (first layer) and the patterned cholesteric liquid crystal layer (second layer) of the incidence diffraction element B, the thickness surface pitch was 8 pitches. In the liquid crystal alignment pattern, the single period over which the optical axis of the liquid crystal compound rotated by 180° was 0.36 μm. The slope pitch of the patterned cholesteric liquid crystal layer (first layer) was 0.33 μm, and the slope pitch of the patterned cholesteric liquid crystal layer (second layer) was 0.38 μm.

Preparation of Intermediate Diffraction Element B

An intermediate was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 5.57 parts by mass, and the thickness was adjusted. The second patterned cholesteric liquid crystal layer was not formed.

In the patterned cholesteric liquid crystal layer (first layer), the thickness surface pitch was 2 pitches, and in the liquid crystal alignment pattern, the single period over which the optical axis derived from the liquid crystal compound rotated by 180° was 0.19 μm. The slope pitch of the patterned cholesteric liquid crystal layer (first layer) was 0.34 μm.

Preparation of Emission Diffraction Element B

An emission diffraction element B was prepared using the same method as that of the incidence diffraction element B, except that the thickness was adjusted.

In the patterned cholesteric liquid crystal layer (first layer) and the patterned cholesteric liquid crystal layer (second layer) of the emission diffraction element B, the thick surface pitch was 2 pitches.

Preparation of Light Guide Element

Light guide elements were prepared using the same methods as those of Examples 1 and 2 and Comparative Example 1, except that the incidence diffraction element R was used as the second incidence diffraction element instead of the intermediate diffraction element R, the intermediate diffraction element B was used as the second intermediate diffraction element instead of the intermediate diffraction element R, and the emission diffraction element B was used as the second emission diffraction element instead of the emission diffraction element R.

Examples 5 and 6 and Comparative Example 3

Light guide elements were prepared using the same methods as those of Examples 1 and 2 and Comparative Example 1, except that the third incidence diffraction element was laminated on the second incidence diffraction element, the third intermediate diffraction element was laminated on the second intermediate diffraction element, and the third emission diffraction element was laminated on the first and second emission diffraction elements.

That is, Example 5 has the configuration shown in FIG. 7, and Example 6 has the configuration shown in FIG. 8.

The incidence diffraction element B was used as the third incidence diffraction element, the intermediate diffraction element B was used as the third intermediate diffraction element, and the emission diffraction element B was used as the third emission diffraction element.

Example 7

A first intermediate diffraction element (intermediate diffraction element G) was prepared using the same method as that of Example 1, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.52 parts by mass, and the thickness was adjusted.

In the patterned cholesteric liquid crystal layer (first layer) of the intermediate diffraction element G, the thickness surface pitch was 2 pitches, and in the liquid crystal alignment pattern, the single period over which the optical axis derived from the liquid crystal compound rotated by 180° was 0.25 µm. The slope pitch of the patterned cholesteric liquid crystal layer (first layer) was 0.42 µm.

A second intermediate diffraction element (intermediate diffraction element R) was prepared using the same method as that of Example 1, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.21 parts by mass, and the thickness was adjusted.

In the patterned cholesteric liquid crystal layer (first layer) of the intermediate diffraction element R, the thickness surface pitch was 2 pitches, and in the liquid crystal alignment pattern, the single period over which the optical axis derived from the liquid crystal compound rotated by 180° was 0.29 µm. The slope pitch of the patterned cholesteric liquid crystal layer (first layer) was 0.45 µm.

A light guide element was prepared using the same method as that of Example 1, except that the first intermediate diffraction element, the second intermediate diffraction element, the first emission diffraction element, and the second emission diffraction element were cut out after changing a cut-out direction with respect to the periodic direction of the diffraction structure, and in case of being disposed on the light guide element, an angle between the periodic direction of the diffraction structure of the first emission diffraction element and the periodic direction of the diffraction structure of the second emission diffraction element was 60°.

Example 8

A first intermediate diffraction element (intermediate diffraction element G) was prepared using the same method as that of Example 1, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.31 parts by mass, and the thickness was adjusted.

In the patterned cholesteric liquid crystal layer (first layer) of the intermediate diffraction element G, the thickness surface pitch was 2 pitches, and in the liquid crystal alignment pattern, the single period over which the optical axis derived from the liquid crystal compound rotated by 180° was 0.27 µm. The slope pitch of the patterned cholesteric liquid crystal layer (first layer) was 0.44 µm.

A second intermediate diffraction element (intermediate diffraction element R) was prepared using the same method as that of Example 1, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.03 parts by mass, and the thickness was adjusted.

In the patterned cholesteric liquid crystal layer (first layer) of the intermediate diffraction element R, the thickness surface pitch was 2 pitches, and in the liquid crystal alignment pattern, the single period over which the optical axis derived from the liquid crystal compound rotated by 180° was 0.32 µm. The slope pitch of the patterned cholesteric liquid crystal layer (first layer) was 0.47 µm.

A light guide element was prepared using the same method as that of Example 1, except that the first intermediate diffraction element, the second intermediate diffraction element, the first emission diffraction element, and the second emission diffraction element were cut out after changing a cut-out direction with respect to the periodic direction of the diffraction structure, and in case of being disposed on the light guide element, an angle between the periodic direction of the diffraction structure of the first emission diffraction element and the periodic direction of the diffraction structure of the second emission diffraction element was 30°.

Example 9

A first intermediate diffraction element (intermediate diffraction element G) was prepared using the same method as that of Example 1, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.87 parts by mass, and the thickness was adjusted.

In the patterned cholesteric liquid crystal layer (first layer) of the intermediate diffraction element G, the thickness surface pitch was 2 pitches, and in the liquid crystal alignment pattern, the single period over which the optical axis derived from the liquid crystal compound rotated by 180° was 0.22 µm. The slope pitch of the patterned cholesteric liquid crystal layer (first layer) was 0.39 µm.

A second intermediate diffraction element (intermediate diffraction element R) was prepared using the same method as that of Example 1, except that the single period of the alignment pattern to be formed on the alignment film was changed by changing the intersecting angle (intersecting angle α) between two light components during the exposure of the alignment film, the amount of the chiral agent in the composition for forming the patterned cholesteric liquid crystal layer (first layer) was changed to 4.52 parts by mass, and the thickness was adjusted.

In the patterned cholesteric liquid crystal layer (first layer) of the intermediate diffraction element R, the thickness surface pitch was 2 pitches, and in the liquid crystal alignment pattern, the single period over which the optical axis derived from the liquid crystal compound rotated by 180° was 0.26 µm. The slope pitch of the patterned cholesteric liquid crystal layer (first layer) was 0.42 µm.

A light guide element was prepared using the same method as that of Example 1, except that the first intermediate diffraction element, the second intermediate diffraction element, the first emission diffraction element, and the second emission diffraction element were cut out after changing a cut-out direction with respect to the periodic direction of the diffraction structure, and in case of being disposed on the light guide element, an angle between the periodic direction of the diffraction structure of the first emission diffraction element and the periodic direction of the diffraction structure of the second emission diffraction element was 120°.

Evaluation

Regarding each of the prepared light guide elements, whether or not multiple images occurred was evaluated using the following method.

An image display apparatus was prepared in which a projection display used for Blade (manufactured by Vuzix) was disposed to emit an image to the incidence diffraction element. A circular polarization plate was disposed between the projection display and the incidence diffraction element such that an image of right circularly polarized light was projected to the incidence diffraction element. In addition, one projection display was used for the light guide plate having the configuration in which the first incidence diffraction element and the second incidence diffraction element were laminated, and two projection displays were used for the light guide plate having the configuration where the first incidence diffraction element and the second incidence diffraction element were disposed to be spaced from each other in the plane direction.

An image was displayed using the prepared image display apparatus, and multiple images were evaluated as follows.
- A case where the occurrence of multiple images was not substantially visually recognized was evaluated as A.
- A case where the occurrence of multiple images was visually recognized but the degree thereof was low was evaluated as B.
- A case where the occurrence of multiple images was weakly visually recognized but the degree thereof was within the allowable range was evaluated as C.
- A case where the occurrence of multiple images was visually recognized and conspicuous was evaluated as D.

The results are shown in the following table.

It can be seen from Table 1 that, in Examples 1 to 9 of the light guide element according to the embodiment of the present invention where the periodic direction of the diffraction structure of the first emission diffraction element and the periodic direction of the diffraction structure of the second emission diffraction element intersected with each other, the occurrence of multiple images was further suppressed as compared to Comparative Examples where the periodic direction of the diffraction structure of the first emission diffraction element and a periodic direction of the diffraction structure of the second emission diffraction element did not intersect with each other.

In addition, it can be seen from a comparison between Examples 1 and 7 to 9 that the intersecting angle between the periodic direction of the diffraction structure of the first emission diffraction element and the periodic direction of the diffraction structure of the second emission diffraction element is preferably 60° or more and more preferably 90° or more.

As can be seen from the above results, the effects of the present invention are obvious.

The present invention is suitably applicable to various optical devices such as AR glasses in which light guiding is used.

EXPLANATION OF REFERENCES

10: image display apparatus
12: display element
14, 14b: light guide element
16: light guide plate
18a: first incidence diffraction element
18b: second incidence diffraction element
18c: third incidence diffraction element
20a: first intermediate diffraction element
20b: second intermediate diffraction element
20c: third intermediate diffraction element
24a: first emission diffraction element

TABLE 1

| | Incidence Diffraction Element | | | Intermediate Diffraction Element | | | Emission Diffraction Element | | | Intersecting Angle between Periodic Directions | | Positional Relationship between First Incidence Diffraction Element and Second Incidence Diffraction Element | Evaluation |
|---|---|---|---|---|---|---|---|---|---|---|---|---|---|
| | $\Lambda_{i1}$ μm | $\Lambda_{i2}$ μm | $\Lambda_{i3}$ μm | $\Lambda_{e1}$ μm | $\Lambda_{e2}$ μm | $\Lambda_{e3}$ μm | $\Lambda_{o1}$ μm | $\Lambda_{o2}$ μm | $\Lambda_{o3}$ μm | First and Second [°] | First and Third [°] | | Multiple Images |
| Comparative Example 1 | 0.43 | 0.51 | — | 0.23 | 0.28 | — | 0.43 | 0.51 | — | 0 | — | Laminated | D |
| Example 1 | 0.43 | 0.51 | — | 0.23 | 0.28 | — | 0.43 | 0.51 | — | 90 | — | Laminated | A |
| Example 2 | 0.43 | 0.51 | — | 0.23 | 0.28 | — | 0.43 | 0.51 | — | 90 | — | Different Positions | A |
| Example 7 | 0.43 | 0.51 | — | 0.25 | 0.29 | — | 0.43 | 0.51 | — | 60 | — | Laminated | B |
| Example 8 | 0.43 | 0.51 | — | 0.27 | 0.32 | — | 0.43 | 0.51 | — | 30 | — | Laminated | C |
| Example 9 | 0.43 | 0.51 | — | 0.22 | 0.26 | — | 0.43 | 0.51 | — | 120 | — | Laminated | A |
| Comparative Example 2 | 0.43 | 0.36 | — | 0.23 | 0.19 | — | 0.43 | 0.36 | — | 0 | — | Laminated | D |
| Example 3 | 0.43 | 0.36 | — | 0.23 | 0.19 | — | 0.43 | 0.36 | — | 90 | — | Laminated | A |
| Example 4 | 0.43 | 0.36 | — | 0.23 | 0.19 | — | 0.43 | 0.36 | — | 90 | — | Different Positions | A |
| Comparative Example 3 | 0.43 | 0.51 | 0.36 | 0.23 | 0.28 | 0.19 | 0.43 | 0.51 | 0.36 | 0 | 90 | Laminated | D |
| Example 5 | 0.43 | 0.51 | 0.36 | 0.23 | 0.28 | 0.19 | 0.43 | 0.51 | 0.36 | 90 | 90 | Laminated | A |
| Example 6 | 0.43 | 0.51 | 0.36 | 0.23 | 0.28 | 0.19 | 0.43 | 0.51 | 0.36 | 90 | 90 | Different Positions | A |

24b: second emission diffraction element
24c: third emission diffraction element
29, 35: liquid crystal diffraction element
30: support
32: alignment film
34, 34b: patterned cholesteric liquid crystal layer
36, 36b: patterned liquid crystal layer
40: liquid crystal compound
40A: optical axis
60: exposure device
62: laser
64: light source
65: $\lambda/2$ plate
68: polarization beam splitter
70a, 70B: mirror
72A, 72B: $\lambda/4$ plate
$R_R$: right circularly polarized light of red light
M: laser light
MA, MB: beam
Po: linearly polarized light
$P_R$: right circularly polarized light
$P_L$: left circularly polarized light
Q: absolute phase
E, E1, E2: equiphase surface
$L_1$, $L_4$: incidence light
$L_2$, $L_5$: transmitted light
U: user

What is claimed is:

1. A light guide element comprising a light guide plate and a first incidence diffraction element, a second incidence diffraction element, a first emission diffraction element, and a second emission diffraction element that are provided on the light guide plate,
    wherein the first incidence diffraction element and the second incidence diffraction element diffract incident light in different directions to be incident into the light guide plate,
    the first emission diffraction element emits light that is diffracted by the first incidence diffraction element and propagates in the light guide plate from the light guide plate,
    the second emission diffraction element emits light that is diffracted by the second incidence diffraction element and propagates in the light guide plate from the light guide plate,
    a period of a diffraction structure of the first incidence diffraction element and a period of a diffraction structure of the second incidence diffraction element are different from each other,
    a period of a diffraction structure of the first emission diffraction element and a period of a diffraction structure of the second emission diffraction element are different from each other,
    the first emission diffraction element and the second emission diffraction element are disposed at a position where the first emission diffraction element and the second emission diffraction element overlap each other in a plane direction of a main surface of the light guide plate, and
    a periodic direction of the diffraction structure of the first emission diffraction element and a periodic direction of the diffraction structure of the second emission diffraction element intersect with each other.

2. The light guide element according to claim 1, further comprising a first intermediate diffraction element and a second intermediate diffraction element that are provided on the light guide plate,
    wherein the first intermediate diffraction element diffracts light that is diffracted by the first incidence diffraction element and propagates in the light guide plate to the first emission diffraction element,
    the second intermediate diffraction element diffracts light that is diffracted by the second incidence diffraction element and propagates in the light guide plate to the second emission diffraction element, and
    a period of a diffraction structure of the first intermediate diffraction element and a period of a diffraction structure of the second intermediate diffraction element are different from each other.

3. The light guide element according to claim 2,
    wherein each of the first intermediate diffraction element and the second intermediate diffraction element is any one of a surface relief type diffraction element, a volume hologram type diffraction element, or a polarization diffraction element.

4. The light guide element according to claim 3,
    wherein the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

5. The light guide element according to claim 4,
    wherein the liquid crystal diffraction element has a region in which the direction of the optical axis of the liquid crystal compound is helically twisted and rotates in a thickness direction.

6. The light guide element according to claim 4,
    wherein the liquid crystal diffraction element includes a cholesteric liquid crystal layer obtained by immobilizing a cholesteric liquid crystalline phase.

7. The light guide element according to claim 4,
    wherein the liquid crystal diffraction element has a configuration in which the optical axis of the liquid crystal compound is tilted with respect to a main surface of the liquid crystal diffraction element.

8. The light guide element according to claim 4,
    wherein in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

9. The light guide element according to claim 2,
    wherein in a case where the period of the diffraction structure of the first incidence diffraction element is represented by Ai, the period of the diffraction structure of the second incidence diffraction element is represented by $\wedge_{i2}$, the period of the diffraction structure of the first intermediate diffraction element is represented by $\wedge_{e1}$, the period of the diffraction structure of the second intermediate diffraction element is represented by $\wedge_{e2}$, the period of the diffraction structure of the first emission diffraction element is represented by $\wedge_{o1}$, and the period of the diffraction structure of the second emission diffraction element is represented by $\wedge_{o2}$,
    $\wedge_{e1} \leq \wedge_{i1}$,
    $\wedge_{e1} \leq \wedge_{o1}$,
    $\wedge_{e2} \leq \wedge_{i2}$, and
    $\wedge_{e2} \leq \wedge_{o2}$
    are satisfied.

10. The light guide element according to claim 2,
wherein each of the first incidence diffraction element, the second incidence diffraction element, the first emission diffraction element, and the second emission diffraction element is any one of a surface relief type diffraction element, a volume hologram type diffraction element, or a polarization diffraction element.

11. The light guide element according to claim 1,
wherein each of the first incidence diffraction element, the second incidence diffraction element, the first emission diffraction element, and the second emission diffraction element is any one of a surface relief type diffraction element, a volume hologram type diffraction element, or a polarization diffraction element.

12. The light guide element according to claim 1,
wherein the first incidence diffraction element and the second incidence diffraction element are laminated.

13. The light guide element according to claim 1,
wherein the first incidence diffraction element and the second incidence diffraction element are disposed at different positions in the plane direction of the light guide plate.

14. The light guide element according to claim 1,
wherein the first emission diffraction element and the second emission diffraction element are laminated.

15. The light guide element according to claim 1,
wherein the periods of the diffraction structures of the first incidence diffraction element, the second incidence diffraction element, the first emission diffraction element, and
the second emission diffraction element are 1 μm or less.

16. The light guide element according to claim 1, further comprising a third incidence diffraction element and a third emission diffraction element that are provided on the light guide plate,
wherein the third incidence diffraction element and the first incidence diffraction element diffract incident light in different directions to be incident into the light guide plate,
the third emission diffraction element emits light that is diffracted by the third incidence diffraction element and propagates in the light guide plate from the light guide plate,
a period of a diffraction structure of the third incidence diffraction element is different from the periods of the diffraction structures of the first incidence diffraction element and the second incidence diffraction element,
a period of a diffraction structure of the third emission diffraction element is different from the periods of the diffraction structures of the first emission diffraction element and the second emission diffraction element,
the third emission diffraction element is disposed at a position where the third emission diffraction element overlaps the first emission diffraction element and the second emission diffraction element in the plane direction of the main surface of the light guide plate, and
a periodic direction of the diffraction structure of the third emission diffraction element and a periodic direction of the diffraction structure of the first emission diffraction element intersect with each other.

17. The light guide element according to claim 16,
wherein in a case where the period of the diffraction structure of the first incidence diffraction element is represented by $\wedge_{i1}$, the period of the diffraction structure of the second incidence diffraction element is represented by $\wedge_{i2}$, and the period of the diffraction structure of the third incidence diffraction element is represented by $\wedge_{i3}$, $\wedge_{i3} \leq \wedge_{i1} \leq \wedge_{i2}$ is satisfied.

18. An image display apparatus comprising:
the light guide element according to claim 1; and
a display element that emits an image to the first incidence diffraction element and the second incidence diffraction element of the light guide element.

19. The image display apparatus according to claim 18,
wherein the display element emits circularly polarized light.

20. The image display apparatus according to claim 18, comprising:
a first display element that emits an image to the first incidence diffraction element of the light guide element; and
a second display element that emits an image to the second incidence diffraction element of the light guide element,
wherein a center wavelength of light emitted from the first display element and a center wavelength of light emitted from the second display element are different from each other.

* * * * *